United States Patent
Darcy

(10) Patent No.: US 9,892,141 B2
(45) Date of Patent: Feb. 13, 2018

(54) EXTENSIBILITY OF COLLECTABLE DATA STRUCTURES

(71) Applicant: Microsoft Technology Licensing, LLC, Redmond, WA (US)

(72) Inventor: Jerry Darcy, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1 day.

(21) Appl. No.: 14/965,862

(22) Filed: Dec. 10, 2015

(65) Prior Publication Data

US 2017/0169065 A1    Jun. 15, 2017

(51) Int. Cl.
*A63F 1/00* (2006.01)
*G06F 17/30* (2006.01)
*A63F 1/02* (2006.01)
*A63F 13/25* (2014.01)

(52) U.S. Cl.
CPC .......... *G06F 17/30321* (2013.01); *A63F 1/02* (2013.01); *A63F 13/25* (2014.09); *A63F 1/00* (2013.01)

(58) Field of Classification Search
None
See application file for complete search history.

(56) References Cited

U.S. PATENT DOCUMENTS

| 6,533,275 | B2 | 3/2003 | Zaruba et al. | |
| 6,623,010 | B1 * | 9/2003 | Holland, Jr. | A63F 1/02 273/292 |
| 7,216,870 | B1 * | 5/2007 | Bess | A63F 1/00 273/292 |

(Continued)

FOREIGN PATENT DOCUMENTS

CN    14965862    3/2015

OTHER PUBLICATIONS

Dale, Brady, "Bitcoin Enables This Digital Card Game to Share its Cards with Other Games", Published on: Oct. 12, 2015, Available at: http://observer.com/2015/10/deckbound-bitbind-bitcoin-blockchain/, 7 pages.

(Continued)

*Primary Examiner* — Jason Yen
(74) *Attorney, Agent, or Firm* — Newport IP, LLC; Leonard J. Hope

(57) ABSTRACT

The techniques disclosed herein enable users to collect and share a primary data structure defining a centralized object. A primary data structure can be configured to define a front face of a digital card and the centralized object can represent a person, item, or location. The primary data structure can also define attributes, e.g., characteristics or properties, related to the centralized object. The techniques disclosed herein also enable users to collect and share secondary data structures that are dependent on the primary data structure. For example, a dependent object can include an item that can be utilized by a character represented by the centralized object. A single secondary data structure can be configured to define a side of the digital card, such as the back side of a digital card. A number of secondary data structures can be acquired to create a card with any number of sides.

20 Claims, 20 Drawing Sheets

(56) References Cited

U.S. PATENT DOCUMENTS

| | | | |
|---|---|---|---|
| 7,950,664 B2* | 5/2011 | Chan | G09B 19/00 |
| | | | 273/161 |
| 8,182,320 B2 | 5/2012 | Coleman et al. | |
| 8,186,599 B2 | 5/2012 | Fleischer et al. | |
| 8,449,378 B2 | 5/2013 | Michaelson et al. | |
| 8,523,648 B2 | 9/2013 | Gilson et al. | |
| 2002/0043764 A1* | 4/2002 | Imhof | A63F 1/00 |
| | | | 273/292 |
| 2002/0161666 A1 | 10/2002 | Fraki et al. | |
| 2003/0004887 A1 | 1/2003 | Roszak | |
| 2003/0016829 A1 | 1/2003 | Chu | |
| 2005/0037843 A1 | 2/2005 | Wells et al. | |
| 2005/0280213 A1 | 12/2005 | Kenney et al. | |
| 2006/0168544 A1* | 7/2006 | Zaner | G06F 17/30536 |
| | | | 715/836 |
| 2008/0284104 A1 | 11/2008 | Samar | |
| 2009/0023487 A1* | 1/2009 | Gilson | A63F 1/00 |
| | | | 463/11 |
| 2009/0054124 A1 | 2/2009 | Robbers et al. | |
| 2010/0001465 A1 | 1/2010 | Todd et al. | |
| 2013/0024771 A1* | 1/2013 | Satterley | H04L 65/4084 |
| | | | 715/716 |
| 2013/0084947 A1* | 4/2013 | Nicely | G07F 17/326 |
| | | | 463/22 |
| 2014/0164251 A1 | 6/2014 | Loh | |
| 2014/0172826 A1 | 6/2014 | Hoffman | |
| 2014/0187309 A1 | 7/2014 | Trainor et al. | |
| 2014/0304214 A1 | 10/2014 | Sakunkoo | |
| 2015/0024129 A1 | 2/2015 | McConaghy | |
| 2015/0220892 A1 | 8/2015 | Allen | |
| 2015/0220918 A1 | 8/2015 | Davis et al. | |

OTHER PUBLICATIONS

Chris, "Blockchain-Based Trading Card Game Ups Bitcoin 2.0", Published on: Jun. 16, 2015, Available at: http://www.bitcoingg.com/blockchain-based- trading-card-game-ups-bitcoin-2-0/, 5 pages.

Fargo, Scott, "Spells of Genesis a Blockchain Based Trading Card Game", Published on: May 5, 2015, Available at: http://insidebitcoins.com/news/spells-of-genesis-a-blockchain-based-trading-card-game/32262, 7 pages.

"Collectible card games hit the blockchain", Published on: Mar. 20, 2015 Available at: https://www.getbitcoin.com.au/bitcoin-news/collectible-card-games-hit-blockchain, 3 pages.

Wagner, Andrew, "Moonga Game Series to Utilize Blockchain for In-game Assets and Crowdfunding", Published on: May 9, 2015, Available at: https://bitcoinmagazine.com/articles/moonga-game-series-utilize-biockchain-game-assets-crowdfunding-1431120521, 7 pages.

"Infinity Wars—*Animated* Trading Card Game", Published on: Feb. 8, 2013, Available at: https://www.indiegogo.com/projects/infinity-wars-animated-trading-card-game#/story, 30 pages.

Lee, et al., "Facet Analysis of Video Game Genres", In Proceedings of iConference, Mar. 1, 2014, pp. 1-3.

PCT/US2016/063751—International Search Report and Written Opinion, dated Mar. 8, 2017, 13 pages (3590226-WO-PCT).

Nakamoto, Satoshi, "Bitcoin: A Peer-to-Peer Electronic Cash System", Oct. 31, 2008, 9 pages.

PCT/US2016/063749—International Search Report and Written Opinion, dated Mar. 9, 2017, 13 pages (358017-WO-PCT).

"Second Written Opinion Issued in PCT Application No. PCT/US2016/063749", dated Oct. 4, 2017, 6 Pages.

* cited by examiner

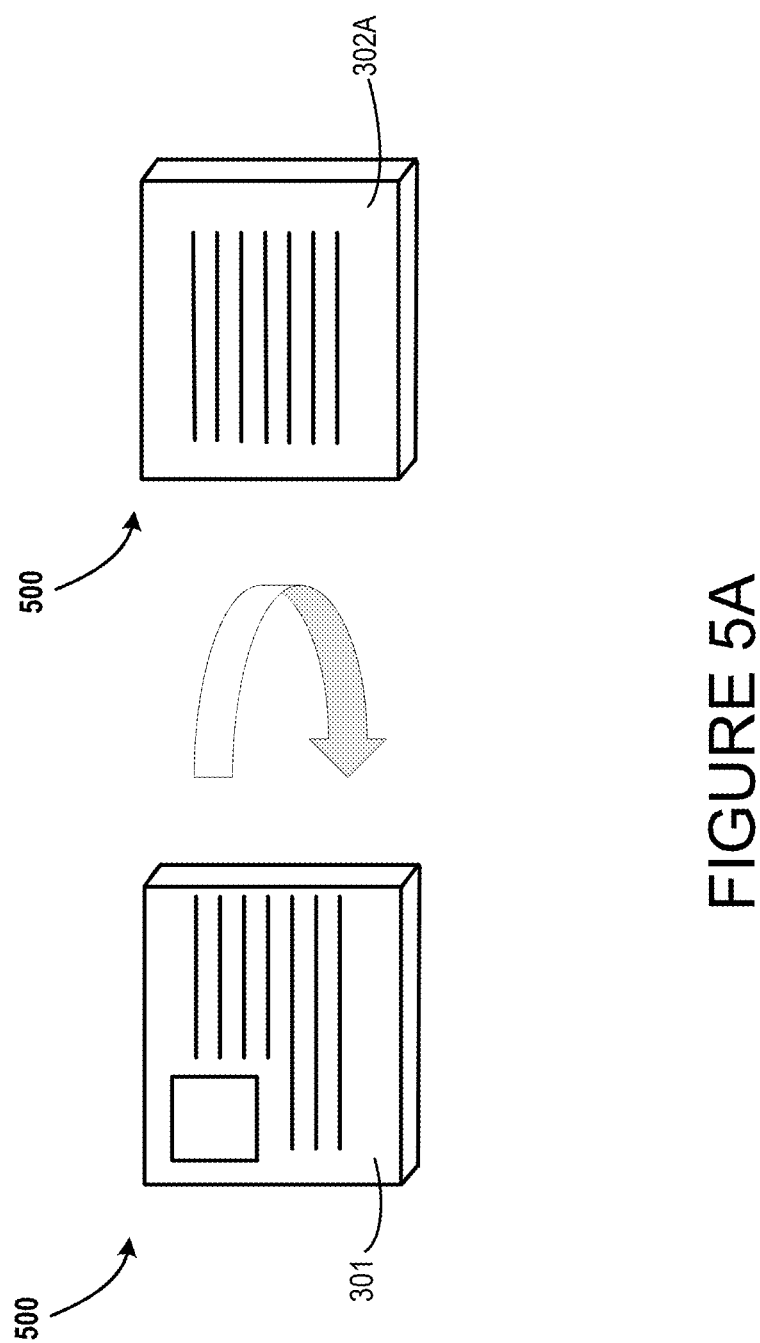

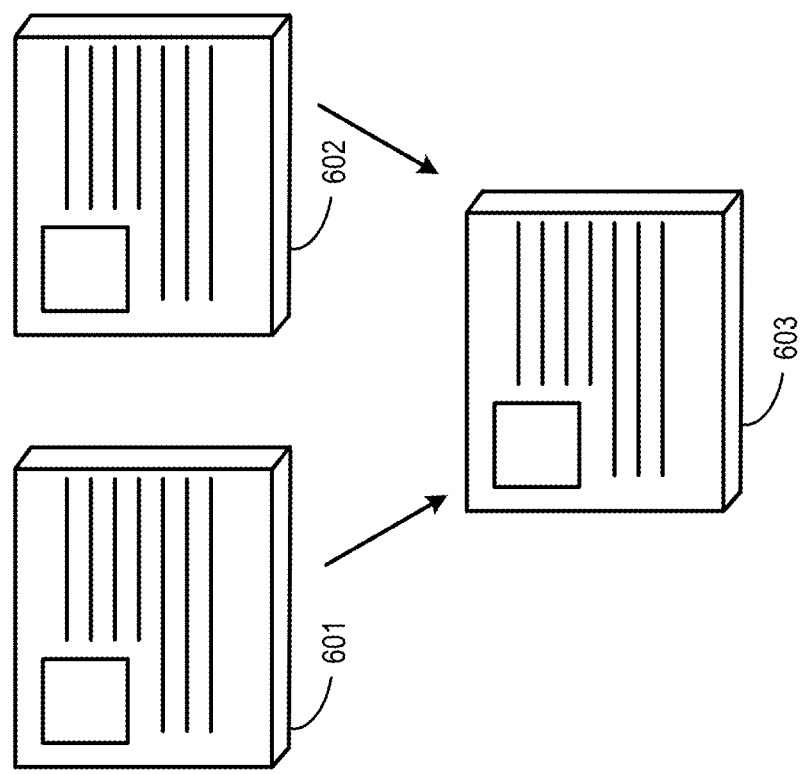

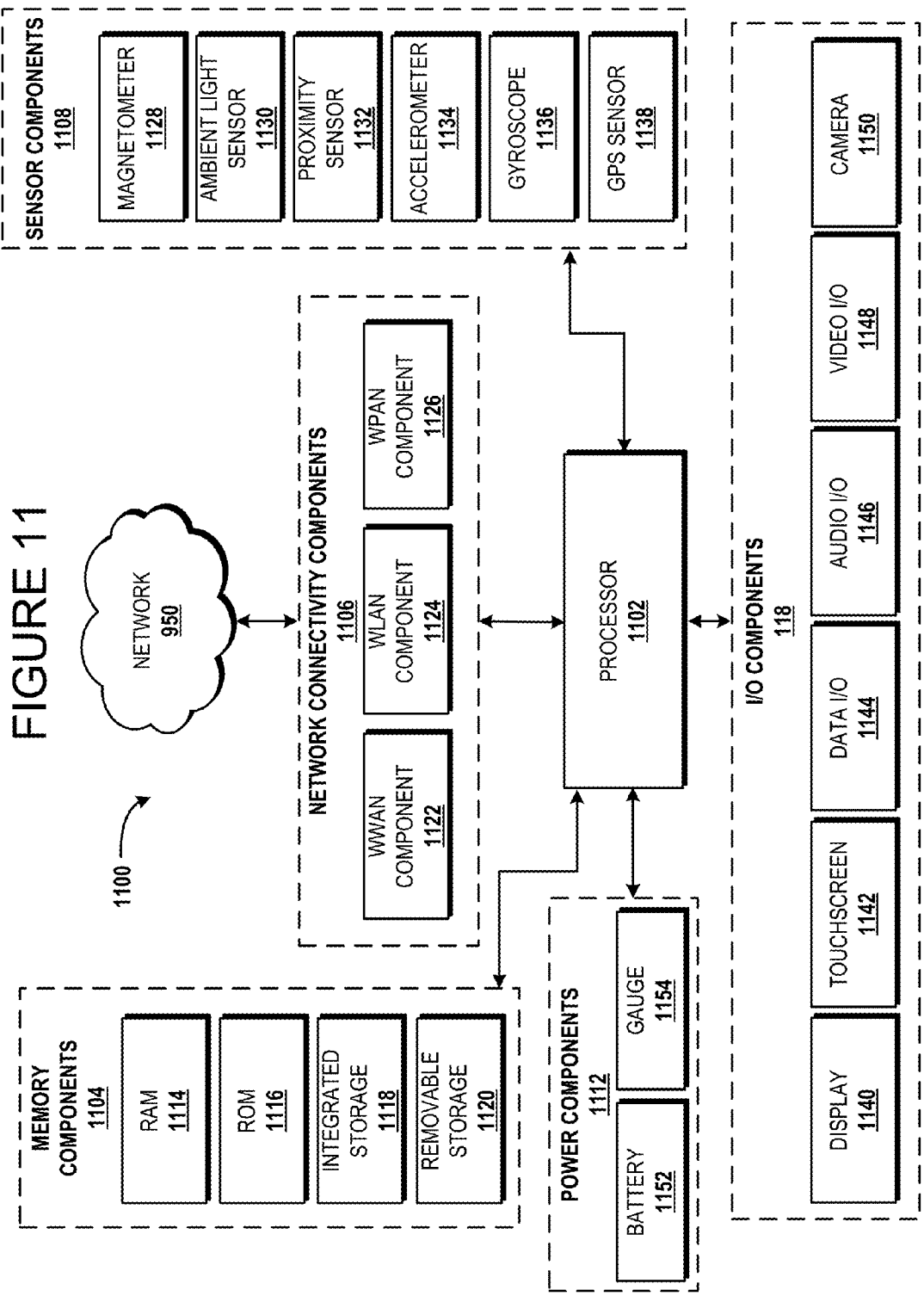

EXTENSIBILITY OF COLLECTABLE DATA STRUCTURES

BACKGROUND

In recent years, digital cards have emerged as a medium that enables users to acquire cards that can be viewed on a computer. Digital cards are sometimes used to represent a character or an item, and in some cases, a digital card can describe capabilities of a character or attributes of one or more items. Digital cards can be used for gaming purposes and in some cases, some digital cards can be purchased by users as an in-application purchase item.

Although some existing systems allow users to acquire and utilize digital cards, such systems have a number of limitations. For instance, in some systems, digital cards can only be used by one application, such as a card game. Although some digital cards can be purchased as an in-application purchase item for a particular application, such cards are also limited to one user account. In addition, some digital cards have a rigid structure that emulate paper cards, e.g., some digital cards only having two sides, e.g., a front surface and a back surface, for displaying images and related data. Such capabilities can restrict how users utilize digital cards. In addition, the limited capabilities of some existing systems can restrict how users interact with one another.

The disclosure made herein is presented with respect to these and other considerations. It is with respect to these and other considerations that the disclosure made herein is presented.

SUMMARY

Technologies described herein enable the extensibility of collectable data structures. In some configurations, the techniques disclosed herein enable users to collect and share a primary data structure defining a centralized object. In one illustrative example, a primary data structure can be configured to define aspects of a front face of a digital card and the centralized object can represent a person, item, or location. The primary data structure can also define attributes, e.g., characteristics or properties, related to the centralized object. The techniques disclosed herein also enable users to collect and share secondary data structures that are dependent on the primary data structure. An individual secondary data structure can define a dependent object and attributes related to the dependent object. For example, a dependent object can define an item that can be utilized by a character represented by the centralized object. A single secondary data structure can be configured to define aspects of a digital card side, which can be displayed as a side of a digital card. A number of secondary data structures can be acquired and utilized to create a card having any number of sides. One or more graphical elements can be generated to enable the display the front face of the digital card with any number of sides. In some configurations, the one or more graphical elements can be configured to indicate an association between the primary data structure and one or more dependent secondary data structures.

Technologies described herein also provide enhanced management capabilities for collectable data structures. In some configurations, the techniques disclosed herein enable users to obtain and share collectable data structures. The collectable data structure can be configured to define an object and attributes related to the object. For example, the collectable data structure can be used to represent a digital card and the object can represent a person, item, or location. The collectable data structure can be configured to function as a stand-alone collectable item, or the collectable data structure can be configured to interact with an application or platform, such as a game application, productivity application, operating system, or a Web-based service. As will be described below, the enhanced management capabilities can enable users to collect, exchange, develop, and/or utilize any type of collectable data structure, including digital card and a digital card side.

In some configurations, the techniques disclosed herein enable users to acquire collectable data structures from a service provider. Once a collectable data structure is acquired by a user, the authenticity of the collectable data structure can be verified by communicating a verification request to the service provider. In addition, techniques disclosed herein enable a user to transfer the collectable data structure to another user by communicating security data to the service provider.

In some configurations, the service provider can utilize a system that is configured to function as a closed system, such as an application store. Closed systems, for example, may be managed and controlled by a single entity, such as a company or person. In such configurations, a single entity can utilize a system to manage a transaction that includes the transfer of a collectable data structure from a first device associated with a first user/entity to a second device associated with a second user/entity.

In some configurations, a service provider can utilize a system that is configured to function as an open system. An open system, for example, can be managed and controlled by a pool of entities operating a plurality of universally managed databases. By utilizing one or more suitable technologies, such as one or more block chain technologies, a device can store and access data defining a transfer of a collectable data structure without the need to rely on a single entity. Transfers can be memorialized in sequential transaction chains that are modified and verified by a number of miner devices. Any device can also verify the authenticity, source, and/or possession of one or more collectable data structures. In addition, as will be described in more detail below, any suitable device having network access to the universally managed databases can cause the generation of security data defining a transfer of a collectable data structure.

In some configurations, a collectable data structure may have one or more immutable sections and one or more modifiable sections. The immutable sections can define, for example, an object that represents a character. The immutable sections can define, for example, a graphical layout of a digital card for display on a user interface. The modifiable sections can define, for example, a magical spell having a value, such as a strength value. In such an example, a user can obtain the collectable data structure having the value at a first level. Interaction with an application can modify the value, and thus over time, the user can possess the collectable data structure having the value at a second level. A transaction involving such a collectable data structure can involve consideration for an exchange of the collectable data structure. In addition, the transaction can also involve the issuance of a commission associated with the consideration to one or more systems, such as an application store. In addition, use of one or more collectable data structures can cause one or more actions, such as the issuance of a reward. Configurations shown in the examples described below also enable one or more actions to be taken based on contextual data received from a number of resources, such a gaming device, computer, e-commerce store, and other resources. In addition, configurations disclosed herein enable the merger of two or more collectable data structures to create merged collectable data structures.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A-5D illustrate views of a single graphical element used for displaying aspects of several collectable data structures, a digital card and several digital card sides;

FIG. 6 illustrates a view of several graphical elements representing a merger between two collectable data structures to create a merged collectable data structure;

FIG. 11 is a computer architecture diagram illustrating a computing device architecture for a computing device capable of implementing aspects of the techniques and technologies presented herein.

DETAILED DESCRIPTION

Figure 1A:
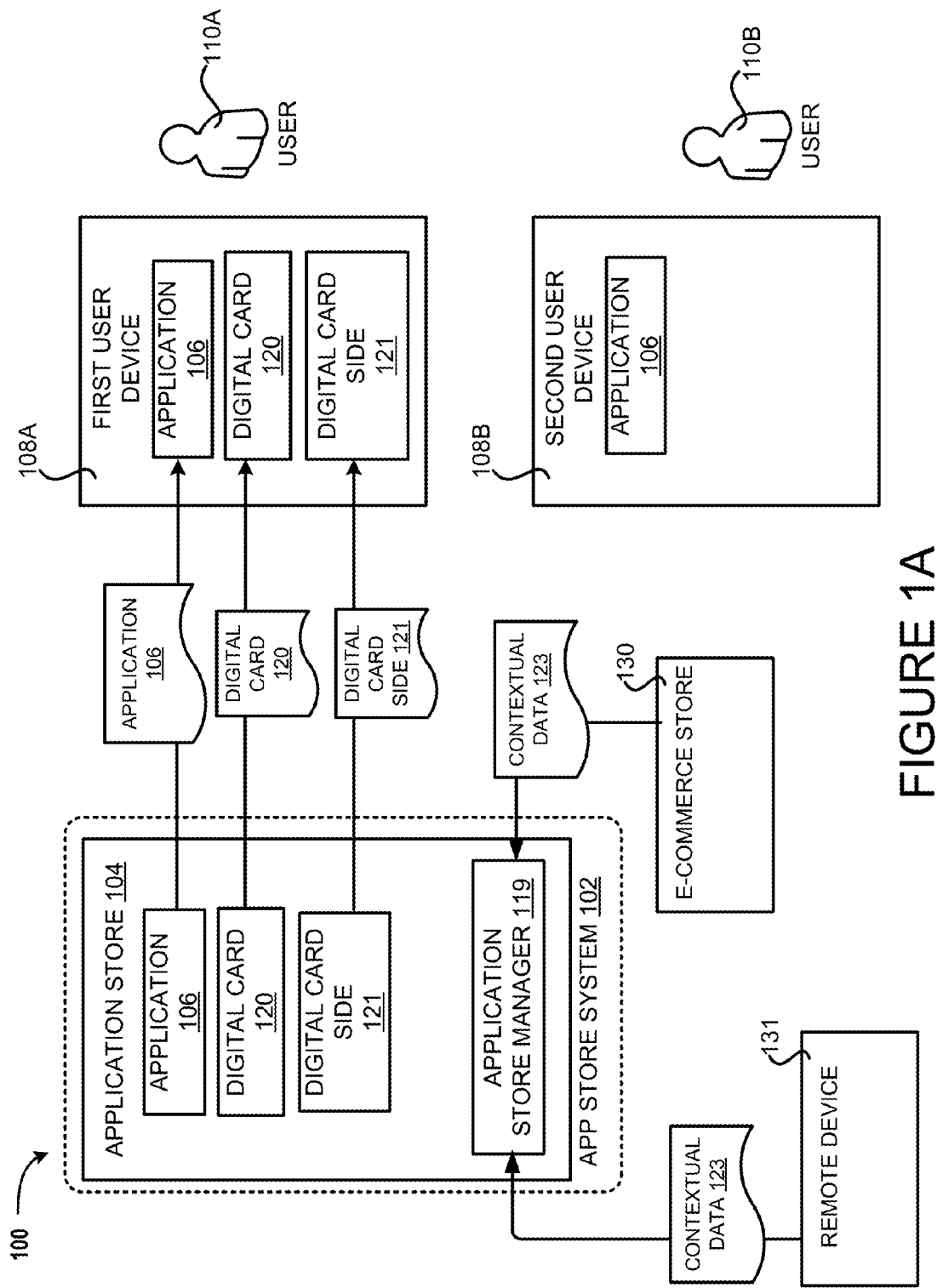
FIG. 1A is a block diagram showing several example devices for enabling the extensibility of collectable data structures.

Technologies described herein enable the extensibility of collectable data structures. In some configurations, the techniques disclosed herein enable users to collect and share a primary data structure defining a centralized object. In one illustrative example, a primary data structure can be configured to define aspects of a front face of a digital card and the centralized object can be configured to represent a person, item, or location. The primary data structure can also define attributes, e.g., characteristics or properties, related to the centralized object. The techniques disclosed herein also enable users to collect and share secondary data structures that are dependent on the primary data structure. An individual secondary data structure can define a dependent object and attributes related to the dependent object. For example, a dependent object can define an item that can be utilized by a character defined by the centralized object. A single secondary data structure can be configured to define aspects of a digital card side, which can be displayed as a side of a digital card. A number of secondary data structures can be acquired to create a card with any number of sides. One or more graphical elements can be configured to display the front face of the card with any number of sides. The graphical elements can be configured to indicate an association between the primary data structure and one or more dependent secondary data structures.

As will be described in more detail below, a device can perform a number of operations to utilize, modify, display, verify, transfer, and otherwise process a digital card or a digital card side. For illustrative purposes, a digital card and a digital card side are collectively and generically referred to herein as "collectible data structures." In addition, a device can operate in conjunction with a number of different services and/or servers, such as the application store, to analyze contextual data defining user activity to generate and share recommendations for consumers to purchase collectible data structures. A collectible data structure can also function as an electronic coupon for product and/or provide links to products and/or services. In another example, a device can operate in conjunction with a number of different services and/or servers, such as the application store, to merge two or more collectible data structures to generate a merged data structure. In yet another example, a device can operate in conjunction with a number of different services and/or servers to facilitate transactions of modifiable collectible data structures. As will be described in more detail below, transactions can involve the transfer of a modifiable collectible data structure, which can also involve the generation and processing of data defining an incentivizing value, which may include a reward, commission, points, or any other incentivizing allocation to a service, entity, server, or device associated with an identity. As will also be described below, contextual data defining user activity can be used to cause one or more actions, such as modify a display of a digital card, one or more digital card sides, and/or a display of an application that involves a card or a side.

Among many benefits provided by the technologies described herein, a user's interaction with one or more devices can be improved, which may reduce the number of inadvertent inputs, reduce the consumption of processing resources, and mitigate the use of one or more computing resources, including processing and network resources. Other technical effects other than those mentioned herein can also be realized from an implementation of the technologies disclosed herein.

It should be appreciated that the subject matter described herein can be implemented as a computer-controlled apparatus, a computer process, a computing system, or as an article of manufacture such as a computer-readable storage medium. These and various other features will be apparent from a reading of the following Detailed Description and a review of the associated drawings. Furthermore, the claimed subject matter is not limited to implementations that solve any or all disadvantages noted in any part of this disclosure.

As will be described in more detail herein, it can be appreciated that implementations of the techniques and technologies described herein may include the use of solid state circuits, digital logic circuits, computer component, and/or software executing on one or more devices. Signals described herein may include analog and/or digital signals for communicating a changed state, movement and/or any data associated with motion detection. Gestures captured by users of the computing devices can use any type of sensor or input device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for providing a mixed environment display of attached control elements. As will be described in more detail below with respect to FIGS. 9-11, there are a number of applications and services that can embody the functionality and techniques described herein.

FIG. 1A is a system architecture diagram showing aspects of the configuration and operation of several components described herein. As shown in FIG. 1A, various computing systems and software components (referred to herein as an application store system 102) may be configured and operated to provide an application store 104. For illustrative purposes, the components shown in FIG. 1A are collectively referred to herein as a system 100. An application store 104 is an electronic marketplace where customers can browse and purchase application programs and other purchase items, such as an application 106, a digital card 120, and a digital card side 121 for download and use on their own customer devices, such as the first user device 108A. As will be described in more detail below, the first user device 108A can also transmit the digital card 120 and the digital card side 121 with other devices, such as the second user device 108B. For illustrative purposes, the first user device 108A and the second user device 108B are collectively and generically referred to herein as "devices 108." An application store 104 might offer applications and purchase items for use on devices 108 such as smart phones, tablet computers, laptop or desktop computers, and/or other types of computing devices. As will be described in more detail below, to provide the functionality described herein, an application store manager 119 of the application store 104 can interact with other systems or platforms including one or more e-commerce stores 130 and a remote device 131.

In order to provide the application store 104 and the other functionality disclosed herein, the application store system 102 might include one or more application servers (not shown in FIG. 1). The application servers may execute a number of software components in order to provide the application store services described herein. The software components can execute on a single application server or in parallel across multiple application servers. In addition, each software component may consist of a number of subcomponents executing on different application servers or other virtual or physical computing resources. Various components may be implemented as software, hardware, or any combination of the two.

For illustrative purposes, the functionality disclosed herein may be implemented, at least in part, by the use of the application store manager 119. As will be described in more detail below, the application store manager 119 may manage the processing and communication of an application 106, digital card 120, and digital card side 121. For illustrative purposes, the application 106 can include any suitable application, such as a game, a virtual reality application, an augmented reality application, a productivity application, a component of an operation system, to name a few examples. By the use of the techniques disclosed herein, one or more services, such as the application store 104, can manage the distribution and duplication of digital cards 120 and some digital card side 121. As will be describe in more detail below, digital cards 120 and digital card sides 121 can be generated by a particular source and techniques disclosed herein enable network-connected devices to verify the authenticity and/or the original source of the generated digital cards 120 and digital card sides 121. For illustrative purposes, the digital card 120 (also referred to herein as a "card 120") and the digital card sides 121 (also referred to herein as a "side 121") are both collectively and generically referred to herein as "collectable data structures."

In some configurations, aspects of a digital card 120 can be stored in a primary data structure defining a centralized object, at least one attribute associated with the centralized object, and a primary security key. In such configurations, the centralized object can represent a person, item, or location. For instance, the centralized object can represent a character of a game, a sports figure, etc. The primary data structure can also define attributes, which can include characteristics, items, locations, or properties related to the centralized object. In some configurations, the primary data structure can store content related to the centralized object and the attributes in the form of text data, image data, audio data, video data, metadata, and/or any other suitable data format. In one illustrative example, the primary data structure can include an image of the character; and data defining a strength, life expectancy, level of wealth, level of experience, etc.

The primary security key of the primary data structure can include any suitable form of security data configured to enable a device to verify the authenticity and/or the source of the primary data structure. As will be disclosed in more detail below, the primary security key of the primary data structure can include a public portion of a public-private key pair, a digital watermark, etc. In some configurations, the primary security key of the primary data structure can also include a unique identifier. As will be described in more detail below, the primary security key can be utilized to verify the authenticity and/or a source of the digital card 120. In addition, the primary security key can be used by a device to control access to aspects of one or more collectable data structures, such as a digital card 120 or a digital card side 121.

Aspects of a digital card side 121 can be stored in a secondary data structure defining a dependent object, an attribute associated with the dependent object, and a secondary security key. In some configurations, the digital card side 121 can include aspects that are dependent on a particular digital card 120. For example, the dependent object of a digital card side 121 can define an item, such as a weapon or a magical spell, that can only be utilized by a particular character of a digital card 120. In such an example, the attributes of the digital card side 121 can define aspects of the dependent object, such as a strength of the weapon or a strength of the magical spell. In other examples, the dependent object or the attributes of a digital card side 121 can be used to augment or supplement the centralized object or the attributes of a digital card 120. In such configurations, with reference to the example above, a digital card side 121 can increase the strength, life expectancy, level of wealth of a character of a digital card 120.

The attributes of the digital card 120 can also define graphical elements for rendering the digital card 120 on a display screen of a device 108. In addition, the attributes of the digital card side 121 can also define graphical elements for rendering the digital card side 121 on a display screen of a device 108. In some configurations, one or more graphical elements can be configured to display an object having any number of sides based, at least in part, on the number of obtained digital card sides 121. In some configurations, a front face of the object can display the contents of the digital card 120, and individual sides of the object can display the contents of the individual digital card sides 121. A user or device can rotate the object to view each side of the object. In addition, the number of sides of the object can change as additional digital card sides 121 are obtained or removed. Aspects of such configurations are described in more detail below.

A digital card side 121 can have one or more dependencies on a particular digital card 120. For instance, in some configurations, the digital card side 121 can include a secondary security key that is dependent on the primary security key. The secondary security key can be configured to control access to the contents of the digital card side 121 based on a possession of a particular digital card 120. For instance, with reference to the above example, if a user obtains a digital card side 121 of the weapon and the magical spell that can only be used by a particular character of a particular digital card 120, techniques disclosed herein may only allow the user to access the contents of the digital card side 121 when the user obtains possession of the particular digital card 120. As will be described in more detail below, a dependency between two or more collectable data structures can be graphically displayed by the use of a text description, video data, color, insignia, border, and/or any other suitable graphical properties indicating a dependency.

With respect to other features disclosed herein, the techniques disclosed herein enable devices associated with one or more identities to control the possession of a collectable data structure. For instance, a card 120 or side 121 can be associated with an organization, individual, company, machine, system, service, device, or any other entity that utilizes at least one identity to store and process data. An identity, for example, may be associated with a user account, smart card, certificate or any other form of authentication. As will be described in more detail below, possession of a collectible data structure can be achieved in many different ways. In some configurations, a collectible data structure can be stored on a server. The server can be configured to provide controlled access using one or more identities. In some configurations, a collectible data structure can be communicated to a remote device associated with an identity. As will also be described in more detail below, the techniques disclosed herein enable one or more devices 108 to transfer the possession of a collectable data structure between identities and/or devices.

In some configurations, the collectable data structures can include distribution parameters, which can define a type of limitation with respect to the distribution and/or number of issuances of a particular card 120 or side 121. For example, a number of issued collectable data structures can be limited to a fixed number. In another example, the distribution of a collectable data structure can be limited by a particular ratio. In such an example, the distribution of a special issue card can be limited to a ratio of the number of special issue cards with respect to a number of generic cards. Thus, additional special issue cards can only be issued if additional generic cards are issued to maintain a particular ratio of special issue cards and generic cards. Other aspects and examples regarding the distribution parameters are described in more detail below.

Returning to FIG. 1, it should be appreciated that the application store computing system 102 shown in FIG. 1 has been simplified for discussion purposes and that many additional software and hardware components may be utilized. In particular, the application store system 102 might interoperate with many other computing systems in order to provide the application store 104. For example, the application store system 102 might interoperate with other systems and/or services not shown in FIG. 1, such as billing systems, reporting systems, customer relationship management systems, and others. As will be described below, the application store system 102 can store data in one or more remote databases for allowing users of the cards 120 and sides 121 to transfer the possession of a card or side without having to rely on the application store system 102.

A user 110 of the application store 104 may interact with a user device 108 to access the application store 104 through a network (not shown in FIG. 1), such as the Internet. A user 110 may be an individual, customer, or entity that desires to browse, purchase, or has purchased, one or more applications from the application store 104. The user device 108 may be a smartphone, personal computer ("PC"), desktop workstation, laptop computer, tablet computer, notebook computer, personal digital assistant ("PDA"), electronic-book reader, game console, set-top box, consumer electronics device, server computer, or any other type of computing device capable of connecting to a data communications network and communicating with the application store 104.

In some configurations, software components executing on the application store system 102 provide functionality for permitting customers to browse and purchase applications 106 available from the application store 104. For instance, the application store 104 may receive a browse request from a first user device 108A and, in response thereto, retrieve information regarding a purchase item, such as an application 106, a digital card 120, or a digital card side 121. The purchase item offered for sale from the application store 104 referenced by the browse request, generate or retrieve information describing the purchase item, and transmit the information over a network to a client application (not shown in FIG. 1) executing on the first user device 108A for display to a first user 110A. The application information may include a name of the purchase item, a text description of the related objects and/or attributes, one or more images of the purchase item, a price for the purchase item, and/or other information, such as a distribution parameter. Similar information regarding a purchase item may be processed and communicated by the application store 104. The application information might be stored in a suitable database or other type of data store maintained by the application store system 102 for each purchase item offered for sale.

The network utilized to connect to the application store 104 might be a local-area network ("LAN"), a wide-area network ("WAN"), the Internet, or any other networking topology known in the art that connects a user device, such as the first user device 108A, to the application store 104. The first user 110A may interface with a client application (not shown in FIG. 1) executing on the first user device 108A to access and utilize the functionality provided by the application store 104. The client application might be a Web browser or a stand-alone client application configured for communicating with the application store 104. The client application might also utilize any number of communication methods known in the art to communicate with the application store 104 across a network, including remote procedure calls, network service calls, remote file access, proprietary client-server architectures, and the like.

In some configurations, the generation of a collectable data structure can be initiated when the application store 104 receives a request for a collectable data structure, which can be a request for a card 120 and/or a request for a side 121. In response to the request for a collectible data structure, the application store 104 can generate a private key and a corresponding public key. The application store 104 can also generate or obtain a collectable data structure defining an object, at least one attribute associated with the object, and the public key. The application store 104 can also store the private key in a database record associated with an identity, such as an identity associated with the first user 110A.

The techniques disclosed herein can enable a user of a device 108 to obtain and control the possession of a collectable data structure. The possession of a collectable data structure can be obtained in many different ways. For instance, the possession of a card 120 or a side 121 can result from a transaction with the application store 104. In such a transaction, a database record controlled by the application store 104 can associate an identity of a user, such as the first user 110A, with a purchased card 120 or side 121. The data structure defining the purchased card 120 or side 121 can then be stored on a device controlled by the application store 104. The application store 104 can then provide the user with controlled access to the purchased card 120 or side 121.

Alternatively, instead of storing the purchased card 120 or side 121 in a device controlled by the application store 104, the purchased card 120 or side 121 can be communicated to a device, such as the first user device 108A. FIG. 1A illustrates such an example. It can also be appreciated that a collectible data structure can also be stored at another resource, such as ONEDRIVE, GOOGLE DRIVE, or other storage device associated with at least one identity.

In some configurations, a collectable data structure can generated and distributed without the use of a public-private key combination. In such configurations, in response to a request for a collectable data structure, the application store 104 can generate or obtain a collectable data structure defining an object, at least one attribute associated with the object, and an identifier. To facilitate the possession, the application store 104 can also generate a first block of a sequential transaction chain associating the identifier with an identity. The application store 104 can also cause a transfer of the collectable data structure to a local storage device or a remote computing device, such as the first user device 108A, associated with the identity.

The sequential transaction chain is based on one or more database technologies, such as a block chain technology, configured to maintain records of security data. As can be appreciated, a database configured with a sequential transaction chain can include records identifying each transfer of a collectable data structure. The database can be maintained and accessed by one or more computers, such as the application store manager 119 or one of the devices 108, to facilitate the possession of a collectable data structure. Public access to the sequential transaction chain allows any user or device to verify the possession, authenticity, and/or source of a collectable data structure. It can be appreciated that by the use of one or more block chain technologies, transactions that define transfers of a collectable data structure can be maintained and accessed by computers without the need for a single entity to manage such transactions.

Figure 1B:
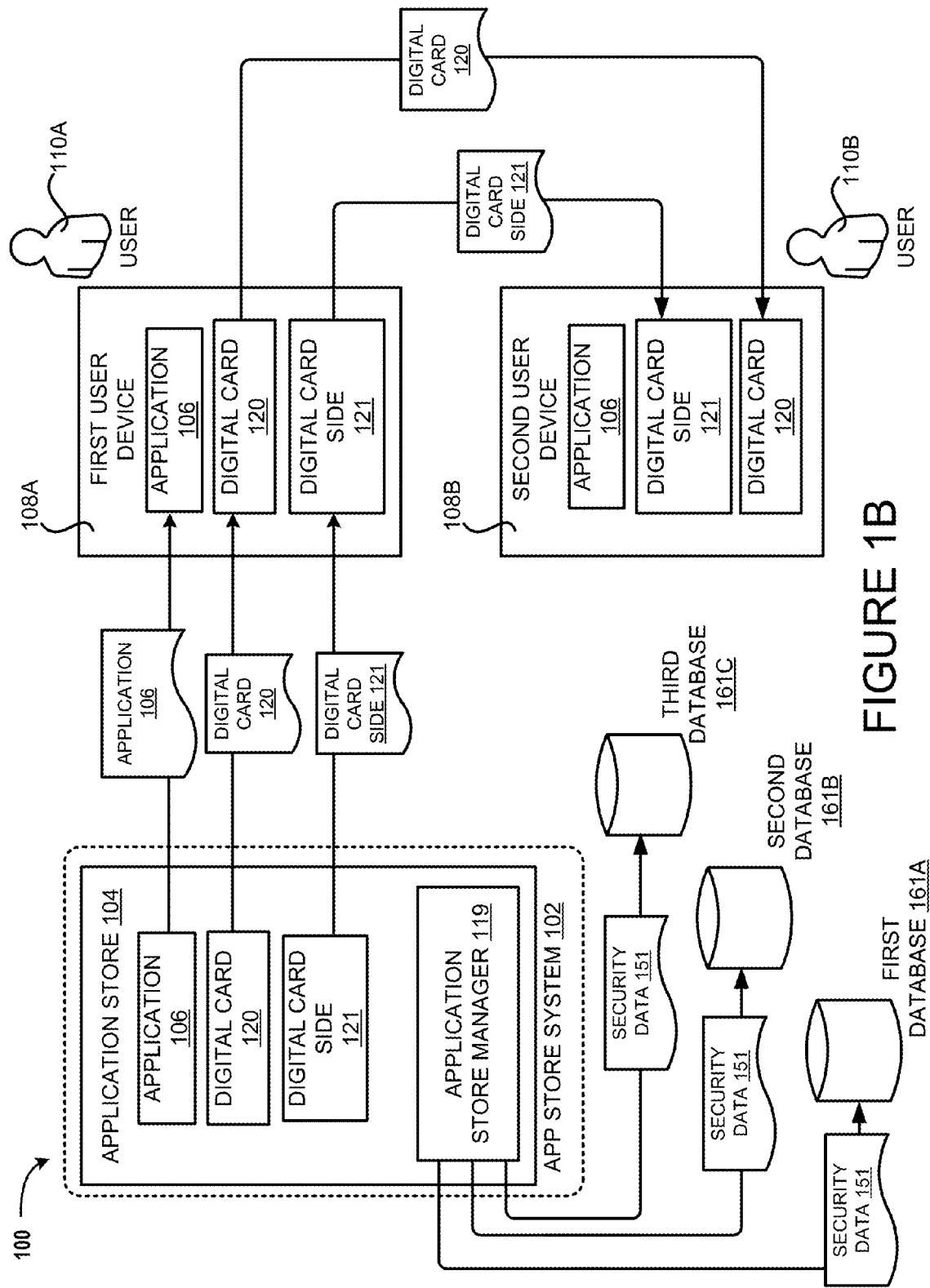
FIG. 1B is a block diagram showing several example devices for enabling the transfer of collectable data structures.

A database configured with records or sequential transaction chains can be part of the application store 104 or part of one or more remote computing devices. As shown in FIG. 1B, configurations may include a first database 161A, a second database 161B, and a third database 161C, which can be referred to herein as "databases 161." In some configurations, the access to the databases 161 can be secured, generally limiting access to the application store 104. In some configurations, access to the databases 161 can be open to the public, wherein each transfer of a collectible data structure can be verified by any network-connected device. These examples are provided for illustrative purposes and are not to be construed as limiting. For example, such techniques can be executed by any server or computing device other than the application store 104. It can also be appreciated that a system 100 can include more or fewer databases 161 than shown in FIG. 1B.

As summarized above, configurations disclosed herein enable a user of a device 108 to transfer the possession of a collectible data structure between identities and/or devices 108. An illustrative example of such a transfer is illustrated in FIG. 1B. In some configurations, a collectible data structure, such as the digital card 120 and/or the digital card side 121, can be communicated from the first user device 108A to a second device 108B. The collectible data structure may be communicated by the use of any suitable network, which may involve the use of any suitable protocol. For example, a collectible data structure may be communicated by the use of an email, a network drive, a transfer protocol, or any other suitable means. In some configurations, the transfer of the collectible the data structure can be facilitated by a service, such as the application store 104, and/or a remote server.

Figure 2A:
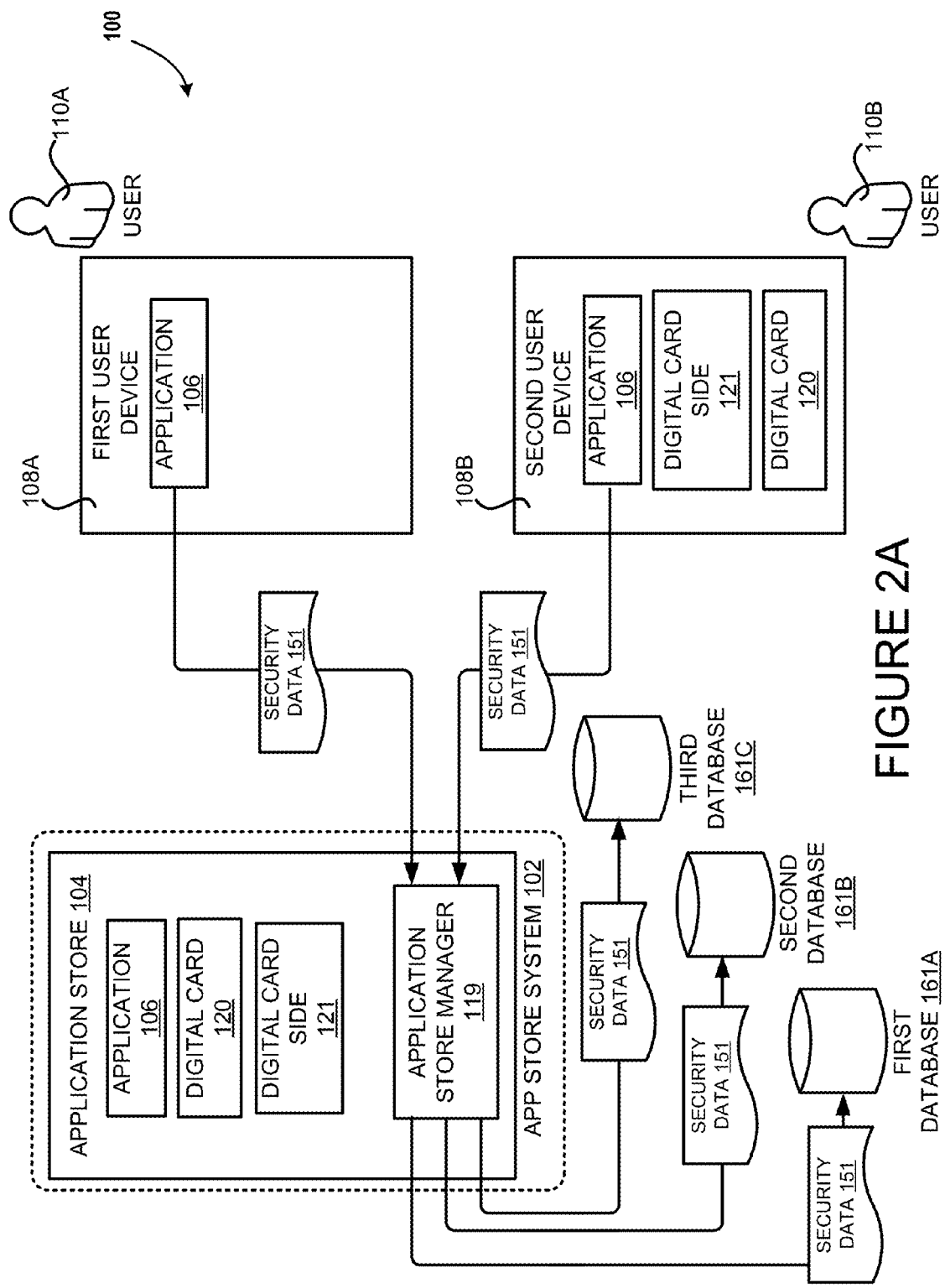
FIG. 2A is a block diagram showing several example devices for enabling the communication of security data used for the transfer of collectable data structures.

FIG. 2A illustrates aspects of configurations where a centralized service, such as the application store 104, is utilized to facilitate the transfer of one or more collectible data structures. In some configurations, when a transfer of a collectible data structure is requested, a device 108, such as the first computing device 108A or the second computing device 108B, can send security data 151 to the centralized service and/or server to record the transfer. The security data 151 can include any suitable information defining the transfer. For example, the security data 151 can include the identity of the user providing the collectible data structure and the identity of a user acquiring the collectible data structure. In addition, the security data 151 can include the identifier and/or a security key of the collectible data structure involved in a transfer.

At the application store 104, the received security data 151 can be utilized to modify or generate a record in a database. In some configurations, the application store 104 can create one or more blocks of the sequential transaction chain associating the transferred collectible data structure with the acquiring identity. In configurations where a public-private key pair is used, a database record can associate the private key of the transferred collectible data structure with the acquiring identity. In the example shown in FIG. 1B, the identity providing the collectible data is associated with the first computing device 108A and the first user 110A, and the acquiring identity is associated with the second computing device 108B and the second user 110B. In some configurations, the application store 104 or another server can also generate and communicate an authorization allowing the second device 108B to access the contents of the transferred collectible data structure.

As summarized above, configurations disclosed herein enable the management of collectible data structures by the use of an open system or a closed system. In some configurations, a service provider can utilize a system that is configured to function as a closed system, such as the application store 104. Closed systems, for example, may be managed and controlled by a single entity, such as a company or person. In such configurations, a single entity can utilize a server or a number of servers to manage a transaction that includes the transfer of a collectable data structure from a first device associated with a first entity to a second device associated with a second entity.

In some configurations, a service provider can utilize a system that is configured to function as an open system. An open system, for example, can be managed and controlled by a pool of entities operating a plurality of universally managed databases, such as the databases 161. By utilizing one or more suitable technologies, such as one or more block chain technologies, a device can store and access data defining a transfer of a collectable data structure without the need to rely on a single entity. Transfers can be memorialized in sequential transaction chains that are modified and verified by a number of miner devices configured to provide hash functionally for updating and verifying block chains. Any suitable network-connected device 108 can verify the authenticity, source, and/or possession of one or more collectable data structures. In addition, any suitable device 108 having network access to a database 161 can cause the generation and storage of security data 151 defining a transfer of a collectable data structure.

Figure 2B:
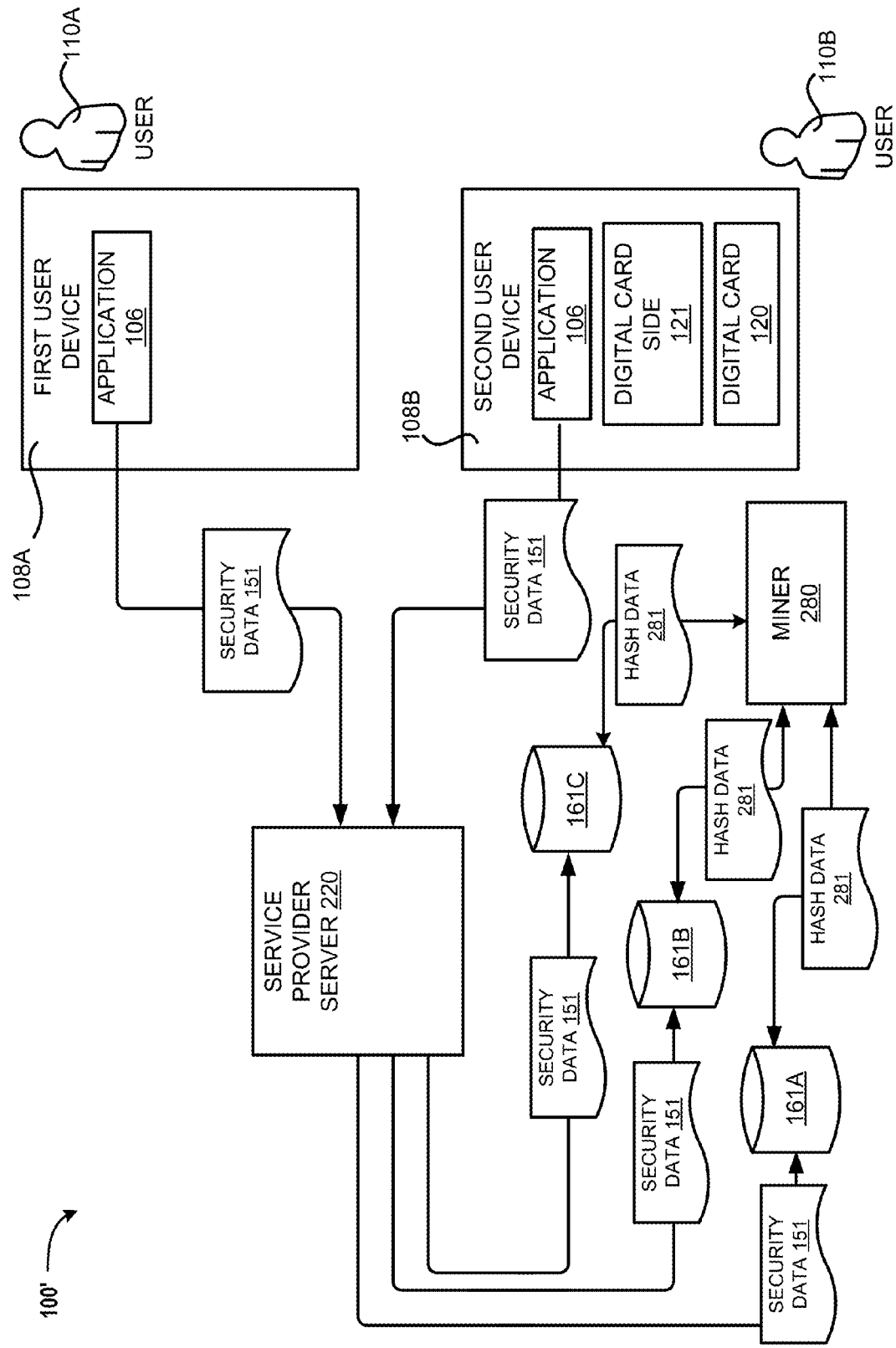
FIG. 2B is a block diagram showing several example devices utilizing a universally managed database for enabling the storage and communication of security data used for the transfer of collectable data structures.

FIG. 2B illustrates one example illustrating an open system 100' configured to manage collectable data structures. Configurations disclosed herein, which can include a service provider server 220, can generate, facilitate the generation, distribution, and processing of collectable data structures as described above. For example, the service provider server 220 can be configured to facilitate a transfer of collectable data structures by receiving security data 151 from one or more devices 108 to generate and update records or sequential transaction chains of one or more databases 161. In this illustrative example, the service provider server 220 can store security data 151 in the first database 161A, second database 161B, and the third database 161C. Such a configuration can be utilized in conjunction with the application store 104 or independent of the application store 104. A database 161 configured with sequential transaction chains are configured to be modified and verified by a number of miner devices 280. The miner devices 280 can provide hash functionally for updating and verifying sequential transaction chains. The miners 280 can communicate hash data 281 configured to verify and generate security data 151 in the databases 116.

Once the possession of a collectible data structure has been established, a device 108 can perform a number of operations to utilize, modify, display, verify, transfer, and otherwise process a collectible data structure. In addition, a device 108 can operate alone or in conjunction with a number of different services and/or servers, such as the application store 104, to generate and share recommendations for consumers to purchase collectible data structures, such as a card 120 or a side 121. A collectible data structure can also function as an electronic coupon for product and/or provide links to products and/or services. In some configurations, a device 108 can operate in conjunction with a number of different services and/or servers, such as the application store 104, to merge two or more collectible data structures to generate a merged data structure. In addition, a device 108 can operate alone or in conjunction with a number of different services and/or servers, such as the application store 104, to facilitate transactions of modifiable collectible data structures. As will be described in more detail below, transactions involving the transfer of modifiable collectible data structures can involve the generation and processing of data defining an incentivizing value, which may include a reward, commission, points, or any other incentivizing allocation to a service, server or device associated with an identity. The following examples illustrate a number of scenarios demonstrating the capabilities of the techniques disclosed herein. As will also be described below, contextual data defining user activity can be used to cause one or more actions, such as the modification of access rights to a collectable data structure, or the modification of a display of a digital card, one or more digital card sides, and/or a display of an application that involves a card or a side.

In one illustrative example, the techniques disclosed herein can enable a device 108 to verify the authenticity, possession, and/or the source of the collectible data structure. In some configurations, a device 108, such as the first user device 108A, can send a request for verification data to the application store 104 or the service provider server 220. The request may include an identifier or a public key of a collectable data structure. Upon receipt of the request, the application store 104 or the service provider server 220 can compare the contents of the request with one or more records. For instance, the application store 104 can determine if the public key of the request matches with a private key of a particular record. If a record of one or more databases indicates the existence of a matching private key, the application store 104 can send verification data to the requesting device 108 indicating that the collectible data structure identified in the request is authentic. In some configurations, the verification data may indicate a source of the collectable data structure identified in the request. In some configurations, the verification data can also indicate a distribution parameter associated with the collectible data structure. For instance, the verification data can indicate that a particular collectable data structure is the first of a total of a thousand issued cards. In some configurations, upon receipt of the verification data, a device 108 can permit access to the contents of the collectible data structure.

In some configurations, the application store 104 can limit and/or control the distribution of a collectible data structure. As described above, a card 120 and a side 121 can include a distribution parameter. The distribution parameter can define a total number of items to be distributed, or a number of items to be distributed in relation to other distributed purchase items. In some configurations, the application store 104 can receive a request to generate a collectable data structure defining the object, which can be a card 120 or a side 121. The application store 104 can then determine if a number of issued collectible data structures exceeds one or more thresholds. If the number of issued collectible data structures does not exceed the one or more thresholds, additional collectible data structures can be issued to one or more devices 108. However, if the number of issued collectible data structures exceeds the one or more thresholds, the application store 104 may not issue additional collectible data structures. In some configurations, when the one or more thresholds is exceeded, the application store 104 may communicate a message indicating that a limit has been reached. Other promotional offers may also be communicated to one or more devices.

Although a collectible data structure, such as a card 120 or a side 121, can have a limited distribution defined by a distribution parameter, a system or service, such as the application store 104, can sometimes increase a limit on a number of distributed items. In addition, when a distribution limit is reached, a system or service can issue derivatives of a collectible data structure. For instance, an example card 120 can have a distribution parameter limiting the number of issued cards to 5000. A system or service can use one or more criteria to detect one or more scenarios, such as a high the rate of sales of the example card 120 and/or a high level of transfer activity of the example card 120 between users. Based on such user activity, and any other user activity, the system or service may reissue derivative cards of the example card 120. For example, a derivative card of the example card 120 may define graphical properties distinguishing the derivative card from the example card 120. The graphical properties may include any distinguishing feature, such as a special border, a new color, a graphical effect giving an appearance of a semitransparent cover, etc. These examples are provided for illustrative purposes and are not to be construed as limiting, as a derivative card or a derivative side can have any attribute associating and/or distinguishing the derivative structure with respect to an original card or an original card side.

With respect to other features disclosed herein, in some configurations, the attributes of a collectible data structure can be configured to indicate a status. The status of a collectible structure can be configured with one or more properties to generate a graphical element indicating and/or describing the status. For instance, a graphical element may include a text description, color, insignia, border, and/or any other graphical properties indicating a status. For illustrative purposes, consider the following example. The application store 104 may be configured to issue a gold status for digital cards 120 that are purchased within the first week from an issue date, a silver status for digital cards that are purchased after the first week of issue but within the first month from the issue date, and a bronze status for digital cards purchased after the first month from the issue date but within the first three months from the issue date. In such an example, an attribute of a card 120 or a side 121 can define a particular graphical feature to indicate the gold, silver, or bronze status. As described below, a status of a card 120 or a side 121 can be displayed using any number of display properties.

With respect to yet other features disclosed herein, previews of collectible data structures (also referred to herein as a "preview structure") can be generated and distributed by a server, service, or device 108. In some configurations, a preview structure can include a subset of content of a collectible data structure. For instance, a preview of a collectible data structure may include a title, a description of a centralized object or a dependent object, a description of related attributes, and information providing instruction on how to obtain the actual collectible data structure. As will be described in more detail below, during gameplay with other users, a user 110 may be presented with a number of preview structures along with other collectible data structures. In such scenarios, the presentation of the preview structures allows users to view complete sets of cards 120 and sides 121, which may provide an incentive for a user to progress in a game, collect more collectable data structures, and/or purchase items at the application store 104 or an e-commerce store 130, and/or conduct other activities.

With respect to other features disclosed herein, configurations can receive and analyze contextual data 123 describing user activity from multiple platforms to initiate one or more actions. For example, a user can purchase an item at a store or reach a particular achievement in a game, and based on such activity, the techniques disclosed herein can cause the execution of one or more actions. To illustrate such features, consider an example scenario where a game, collectable data structure, or a productivity application provides directions on how to acquire a particular digital card 120 or a digital card side 121. The directions, for example, can indicate that the particular digital card 120 or the digital card side 121 can be acquired when the user purchases a product from a store, watches a movie at a theater, plays a video game, visits a website, downloads software, etc. By the use of the techniques disclosed herein, one or more computing devices can receive contextual data 123 defining user activity, and response to receiving the contextual data 123 defining pre-determined user activity, the one or more computing devices can cause one or more actions, such as the issuance and distribution of a particular digital card 120 or a particular digital card side 121. In other examples, receipt of contextual data 123 defining any pre-determined user activity can cause one or more computing devices to modify a display of a collectable data structure, modify a collectable data structure, cause the generation and distribution of one or more collectable data structures, cause the generation of a purchase recommendation or another item, such as an incentivizing reward, and/or modify parameters of an operating system or application, e.g., change the gameplay for a user.

The contextual data 123 defining user activity can be received from a number of devices and services, including an e-commerce store 130 and/or a remote device 131. The contextual data 123 can also come from other remotes resources, such as those referred to in the system diagrams shown in FIG. 10. In one example, the contextual data 123 can include transactional data communicated from an e-commerce store 131 or processed from a purchase at the application store 104. In addition, other remote devices 131, such as an XBOX or PLAYSTATION, can be utilized to collect and communicate contextual data 123. In such a scenario, a user can purchase an item and hold an identifier of the purchased item, such as an ISBN of a book or movie, in front of a camera of the XBOX or PLAYSTATION. Such activity can be interpreted and communicated as contextual data 123 to a service such as the application store 104. It can also be appreciated that a particular product may be configured with a serial number so that a single item cannot be reused to generate contextual data 123.

In another example, contextual data 123 can define user activity, such as achievements and in a particular game, such as CALL OF DUTY, MAGIC or HEARTHSTONE. For example, when a user obtains particular achievements in an application, contextual data 123 describing such activity can be communicated to a service, such as the application store 104, to initiate one or more actions, such as an issuance of a collectible data structure. The application detecting the user activity may be related or unrelated to collectible data structures that are issued in response to the activity. For example, user activity in HEARTHSTONE can cause the generation and distribution of a digital card 120 related to HEARTHSTONE. Alternatively, user activity in HEARTHSTONE can cause the generation and distribution of a digital card 120 related to a completely different game or a stand-alone digital card 120 that can function as a collector's item.

As summarized above, when a service, such as the application store 104, receives the contextual data 123 defining user activity, the service can cause the execution of one or more actions in response to the contextual data 123. For example, in addition to issuing a collectible data structure in response to the contextual data 123, a service can enable a device to convert a preview structure to a collectible data structure. In such an example, if a user has a preview structure stored on a device, the service can provide additional data, such as a security key, enabling the preview structure to function as a collectible data structure.

In some configurations, contextual data 123 defining user activity or a status of an application can be utilized to modify a display of a collectable data structure. In one illustrative example, a graphical element can be used to display a collectable data structure. An individual display surface of the graphical element can have one or more modes. For instance, a display surface of a card or side can have a public view or a private view. The collectable data structure can be configured to display the contents of a surface in the private view to a select group of users. Based on the contextual data defining user activity or a status of an application, a device can control the mode of a display surface. Such configurations can enable a device to display a collectable data structure having a public view to one set of users, but displays multiple sides in a private mode to another set of users.

In another illustrative example, a device 108 can modify a display of a collectable data structure to include an animation based on the contextual data 123 defining user activity or a status of an application. In such configurations, the contextual data 123 can be interpreted and utilized to select relevant animation content, and the selected content can be displayed on one or more surfaces of a graphical element. Such configurations can also involve the modification of the display of an application, such as a game application. Specifically, configurations enable a device to transform the display of a collectable data structure into the display of a graphical element of an application. For instance, the display of a game card may be transformed into the display of a game board.

With respect to other features disclosed herein, by the processing of the contextual data 123 or security data 151, a server can be configured to identify a collectible data structure having modified content and based on the receipt and interpretation of data indicating such a scenario, the server can execute one or more actions. The actions can include the issuance of a collectable data structure, an electronic coupon, a link to another product, a payment of commission associated with a transfer, a division of a transaction fee, and/or a combination of such actions.

In one illustrative example, a collectable data structure can have one or more immutable sections and one or more modifiable sections. The immutable sections can define, for example, an object that represents a character. The immutable sections can also define, for example, a graphical layout of a digital card 120 for display on a user interface. The modifiable sections can define, for example, a strength value of a magical spell. The collectable data structure can be configured such that use of the collectable data structure with an application, such as a game, can modify a value, such as the strength value of the magical spell. Thus, the user can obtain the collectable data structure having the value at a first level. Then, by using the collectable data structure, the value can increase or decrease over time. After use of the collectable data structure, the user can possess the collectable data structure having the value at a second level. By increasing or decreasing one or more levels in a collectible data structure, a user can increase or decrease a market value associated with the collectible data structure. By use of the technologies described herein, the user can then transfer the collectible data structure to another user or identity in exchange for consideration. The consideration can involve the processing of points or any other incentivizing allocation involving any denomination, unit, and/or medium of exchange. In addition to the above-described techniques, a transfer of a collectable data structure having a modified value can also involve the processing and issuance of data defining an incentivizing value, which may include a reward, commission, points, or any other incentivizing allocation to a service, server or device associated with an identity. The incentivizing value can be produced from at least a portion of the consideration, and the incentivizing value can be issued to one or more systems, such as an application store 104. In some configurations, the consideration associated with a transfer of collectible data structure can be divided to generate and distribute data defining the incentivizing value among a number of users, entities, and/or devices.

With respect to other features disclosed herein, configurations can generate and display graphical elements based on the collectible data structures. In some configurations, a device 108 can receive a primary data structure defining a centralized object, at least one attribute associated with the centralized object, and a primary security key. In addition, the device 108 can receive a plurality of secondary data structures, wherein an individual secondary data structure of the plurality of secondary data structures defines a dependent object, an attribute associated with the dependent object, and a secondary security key that is dependent on the primary security key.

Figure 3A:
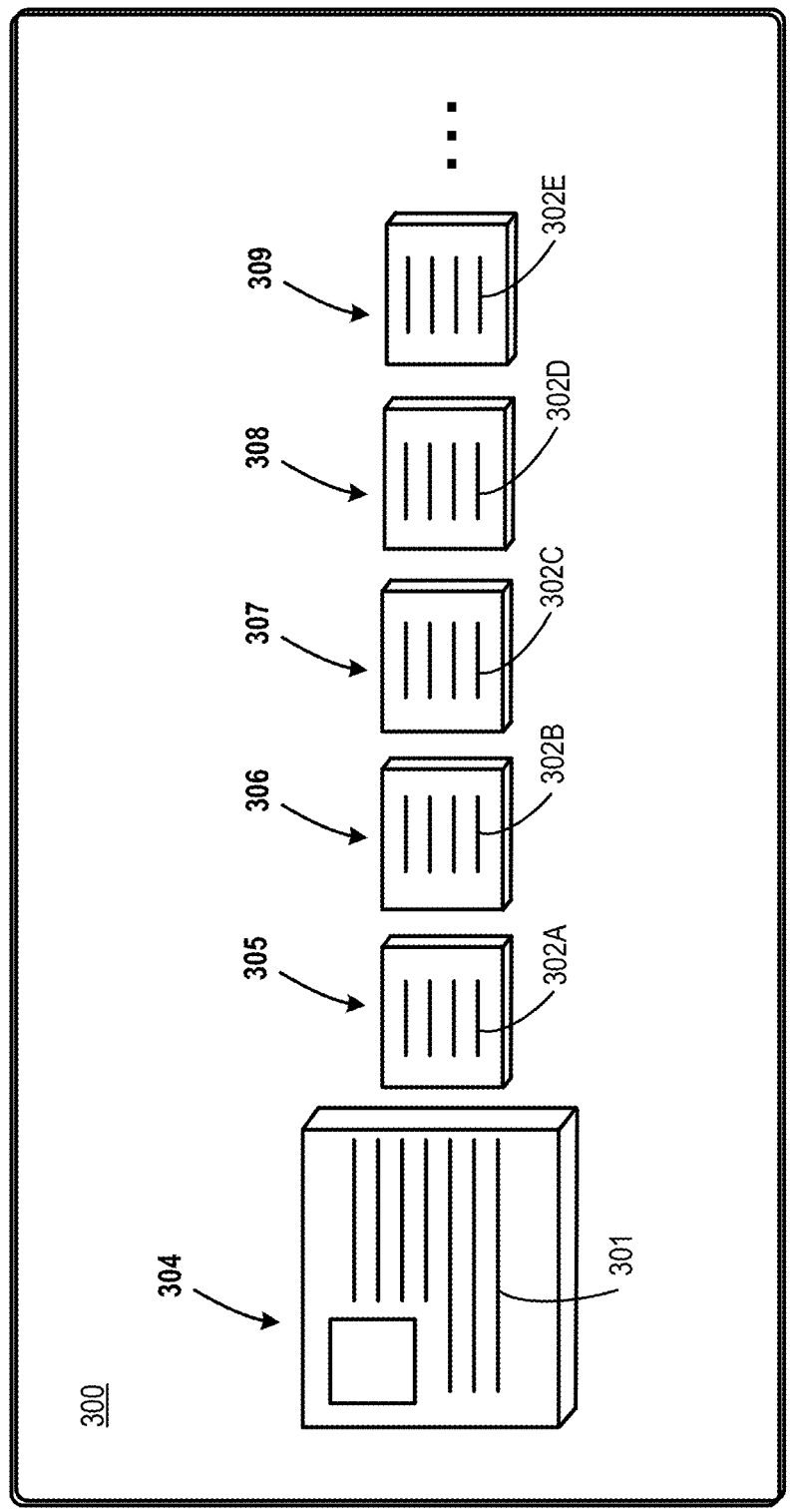
FIGS. 3A-3B illustrate views of graphical elements used for displaying aspects of several collectable data structures, a digital card and several digital card sides.

The device 108 can generate data defining a one or more graphical elements comprising a primary face and a plurality of sides, wherein the primary face is configured to display aspects of the centralized object and the at least one attribute associated with the centralized object, and wherein an individual side of the plurality of sides is configured to display aspects of the dependent object and the attribute associated with the dependent object. The device 108 can also cause a display of the one or more graphical elements on a display surface. The graphical elements can take a number of forms, as shown in some of the examples described below. In some configurations, the collectable data structures can be displayed by the use of a number of graphical elements, examples of which are shown in FIG. 3A through FIG. 4. In some configurations, a number of collectable data structures can be displayed by the use of a single graphical element having an extensible number of sides, examples of which are shown in FIG. 5A through FIG. 5D.

FIG. 3A is a screen diagram showing an example graphical user interface 300 comprising a number of graphical elements configured in accordance with a number of collectable data structures. In this illustrative example, individual graphical elements 304-309 are utilized to render the contents of a primary data structure and plurality of secondary data structures. As shown, a first graphical element 304 is used to render the contents 301 of a card 120 defined by the primary data structure. A second graphical element 305 is used to render the contents 302A of a side 121 defined by a secondary data structure. Other graphical elements 306-309 are used to respectively render the contents 302B-302E of other sides 121 defined by other secondary data structures.

In some configurations, the graphical elements may be arranged to indicate one or more dependencies. For instance, in this example, the first graphical element 304 is larger than the other graphical elements 305-309 to indicate that the other graphical elements 305-309 are dependent on the first graphical element 304. This example is provided for illustrative purposes and is not to be construed as limiting. It can be appreciated that the graphical elements may be in any suitable arrangement to show one or more dependencies. For instance, lines, shapes, colors, and/or other display properties can be used to identify one or more dependencies.

Figure 3B:
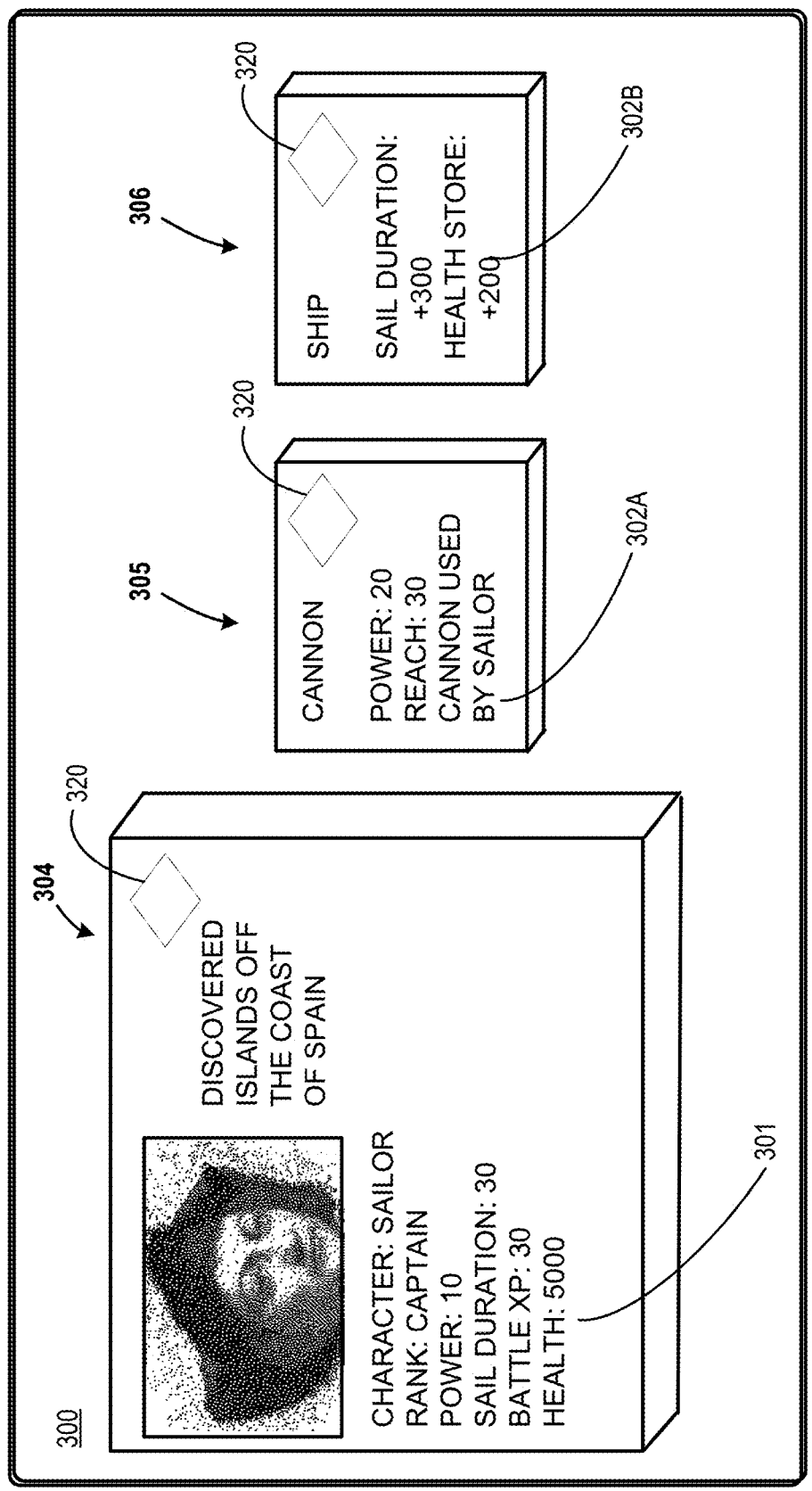
Figure 4:
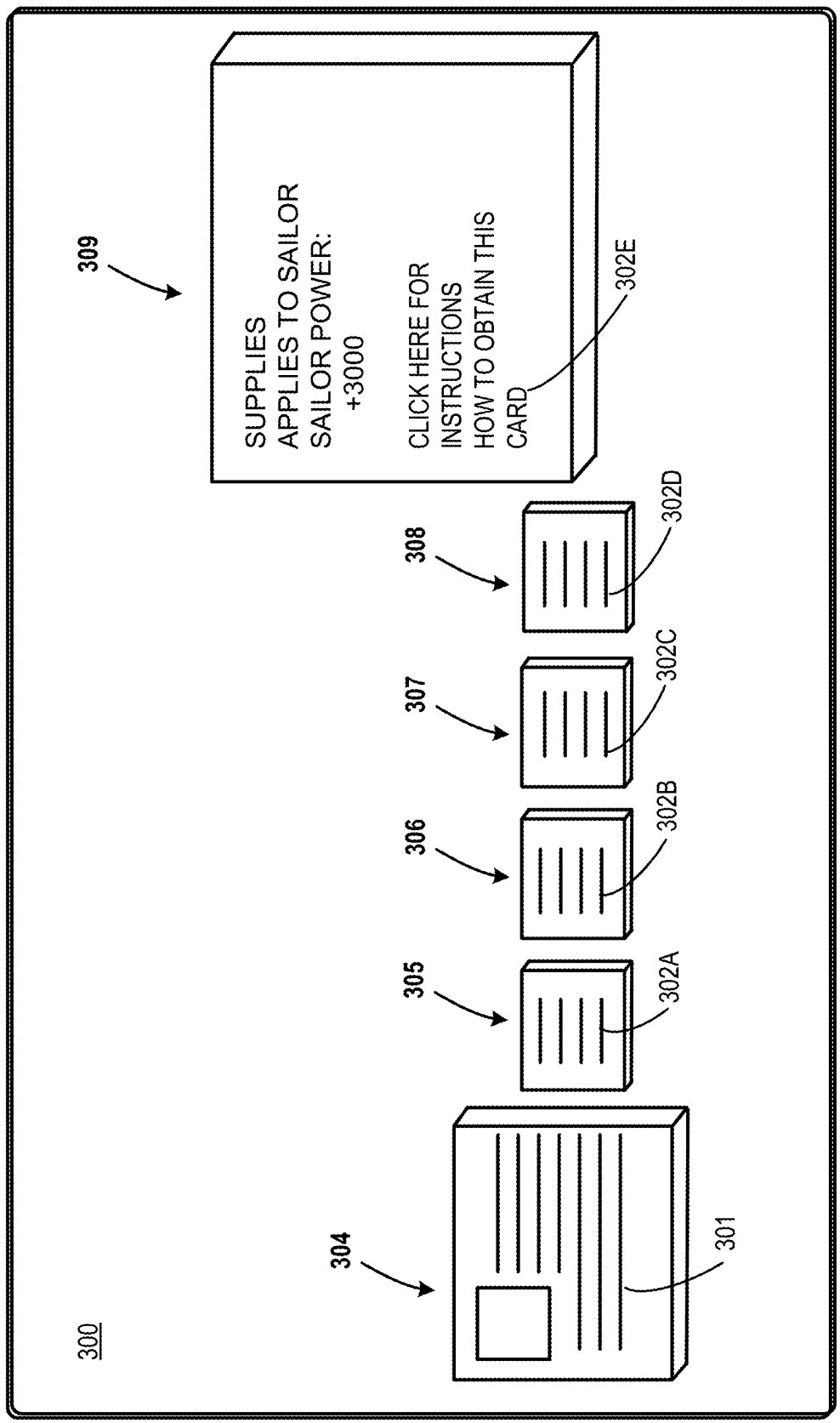
FIG. 4 illustrates a view of several graphical elements used for displaying aspects of several collectable data structures, including a preview structure providing directions for acquiring a collectable data structure.

FIG. 3B is a screen diagram showing a more detailed view of the graphical user interface 300 showing example content of the first graphical element 304, the second graphical element 305, and the third graphical element 306. In this illustrative example, the first graphical element 304 contains the contents 301 of a card 120 defined by a primary data structure. The primary data structure defines the centralized object as a character referred to as a "sailor." The primary data structure also defines a number of attributes associated with the centralized object, such as a rank, power, sail duration, and battle XP. The primary data structure can also include image data, text descriptions, and/or other data related to the centralized object and the attributes.

In addition, in this example, the attributes of the primary data structure also indicate a status. To indicate the status, the first graphical element 304 is configured with an emblem 320. As described above, a status can indicate a time in which a collectible data structure was acquired, a manner in which a collectible data structure was acquired, and/or show a relationship between different data structures. A relationship between various data structures may include an association between a primary data structure and a secondary data structure (also referred to herein as a "dependent data structure.") These examples are provided for illustrative purposes and is not to be construed as limiting.

In the illustrative example of FIG. 3B, the second graphical element 305 contains the contents 302A of a first side 121 defined by a first dependent data structure. The first dependent data structure defines a dependent object as a weapon referred to as a "cannon." The first dependent data structure also defines a number of attributes associated with the dependent object, such as a power value and a reach value. In addition, one of the attributes indicates that the dependent object relates to the centralized object of the primary data structure, e.g., the cannon is associated with the sailor. Also, in this example, the first dependent data structure also defines a status, which is represented by an emblem 320 within the second graphical element 305.

Also shown in the example of FIG. 3B, the third graphical element 306 contains the contents 302B of a second side 121 defined by a second dependent data structure. The second dependent data structure defines a dependent object as a vehicle referred to as a "ship." The second dependent data structure also defines a number of attributes. In this example, the attributes are configured to augment attributes of the primary data structure. Specifically, attributes of the second data structure increase the sail duration of the sailor and the health of the sailor. Also, in this example, the first dependent data structure also defines a status, which is represented by an emblem 320 within the second graphical element 305. As described above, an emblem 320 or any other identifier can be utilized to indicate a time in which a collectible data structure was acquired, a manner in which a collectible data structure was acquired, or a relationship between one or more collectible data structures.

As summarize above, techniques disclosed herein include the generation, distribution and processing of a preview structure. In some configurations, a preview of a collectible data structure may include a title, a description of the centralized object or the dependent object, a description of related attributes, and information providing instruction on how to obtain the actual collectible data structure. To illustrate aspects of a preview structure, FIG. 4 is a screen diagram showing a detailed view of the graphical user interface 300 showing example content 302E of a preview structure embodied in the sixth graphical element 309. In this illustrative example, the preview structure defines a title as "supplies," a description noting that the preview structure applies to the "sailor," and a description of the attributes. In this illustrative example, the attributes augment an attribute of the sailor, adding power to the sailor. In addition, the preview structure includes instructions on how to obtain the collectible data structure having the described attributes. The instructions can also include code for performing one or more operations. In this illustrative example, the preview structure includes a link that can be selected by user for executing a transaction for the user to acquire a fully functioning collectible data structure.

Although this example illustrates a configuration that includes a link for executing a transaction, it can be appreciated that the instructions defined in the preview structure may describe one or more tasks for a user to carry out in order to acquire a fully functioning collectible data structure. As summarized above, the user may be required to purchase an item at a store, perform one or more achievements in a videogame, or perform any other task or function detectable by the system 100 described herein.

Referring now to FIG. 5A through FIG. 5D, another example graphical element for displaying content of a collectable data structure is shown and described below. As summarized above, a number of collectable data structures can be represented by a single graphical element having an extensible number of sides. In one illustrative example, a graphical element may be generated for the display of a digital card 120. One surface of the graphical element can be configured to display the contents of the digital card 120. As additional digital card sides 121 are received, the graphical element can be modified to add at least one new surface for displaying the contents of an individual card side 120.

FIG. 5A is a diagram showing multiple perspectives of a graphical element 500 configured to display the contents of a digital card 120 and a digital card side 121. As shown, the graphical element 500 is configured with two surfaces. A first surface is shown in the illustration of the graphical element 500 on the left side of FIG. 4A. The first surface, e.g., a front face of the card, is configured to display the contents 301 of the digital card 120. In this illustrative example, the graphical element 500 is configured to rotate based on a user input or another command. Upon rotation of the graphical element 500, a second surface can be displayed to a user. The second surface is shown in the illustration of the graphical element 500 on the right side of FIG. 5A. The second surface is configured to display the contents 302A of the digital card side 121.

Figure 5B:
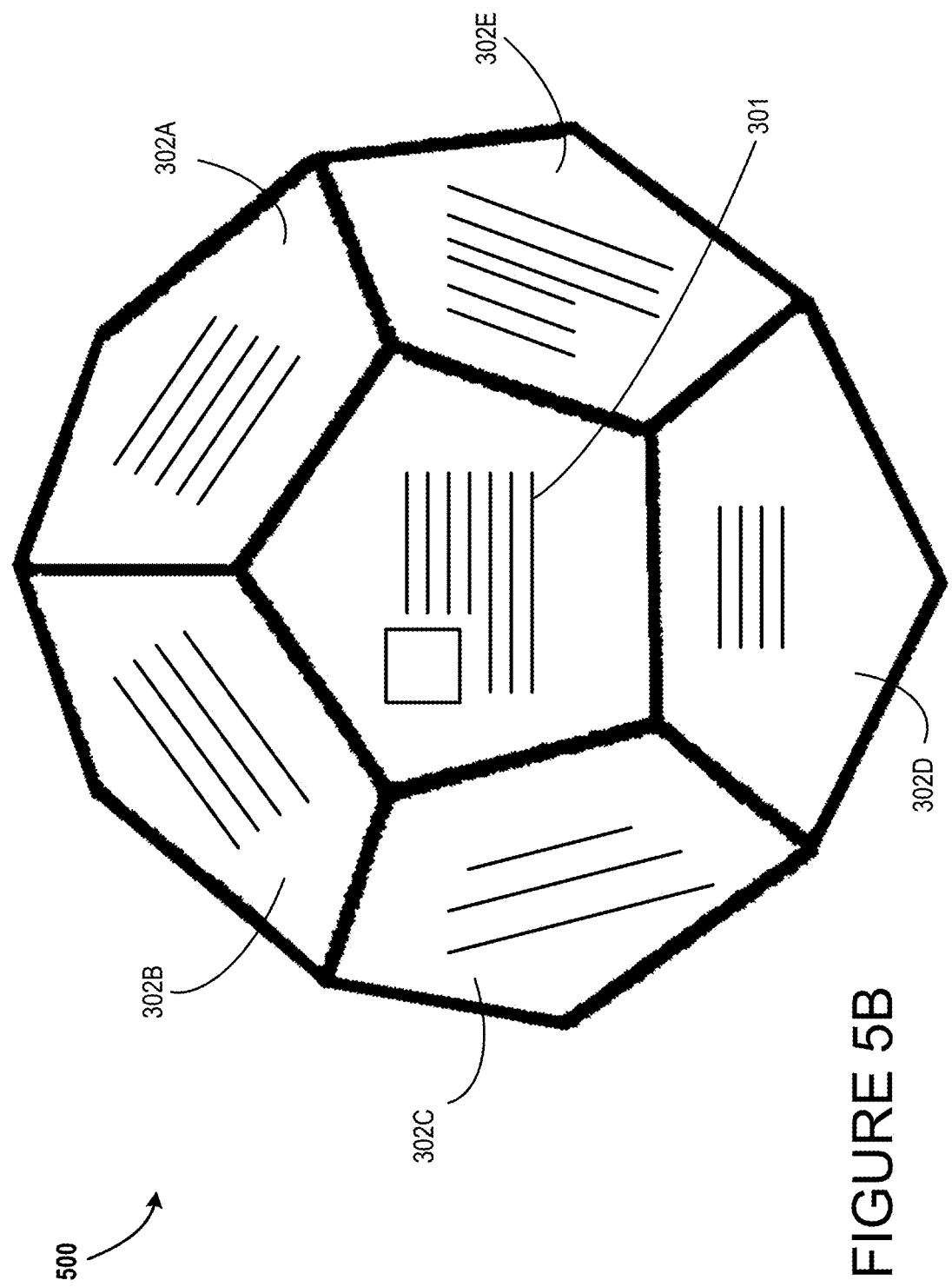

As described above, as additional digital card sides 121 are obtained, the configuration of a graphical element can be modified to include additional surfaces to display the contents of each of the obtained digital card side 121. To illustrate such configurations, FIG. 5B illustrates the result of a modification to the graphical element 500 shown in FIG. 5A. In this illustrative example, it is a given that a device 108 displaying the graphical element 500 receives four additional card sides 121. Thus, the illustration shown in FIG. 5B shows a configuration of the graphical element 500 configured to accommodate the digital card, the first card side, and the additional four card sides.

The graphical element 500 shown in FIG. 5B is one example configuration having six surfaces. A first surface is configured in the center of the graphical element 500. The first surface, e.g., a front face, is configured to display the contents 301 of the digital card 120. A second surface is configured to display the contents 302A of the first digital card side, a third surface is configured to display the contents 302B of the second digital card side, a fourth surface is configured to display the contents 302C of the third digital card side, a fifth surface is configured to display the contents 302D of the fourth digital card side, and a sixth surface is configured to display the contents 302E of the fifth digital card side. This example is provided for illustrative purposes and is not to be construed as limiting.

Figure 5C:
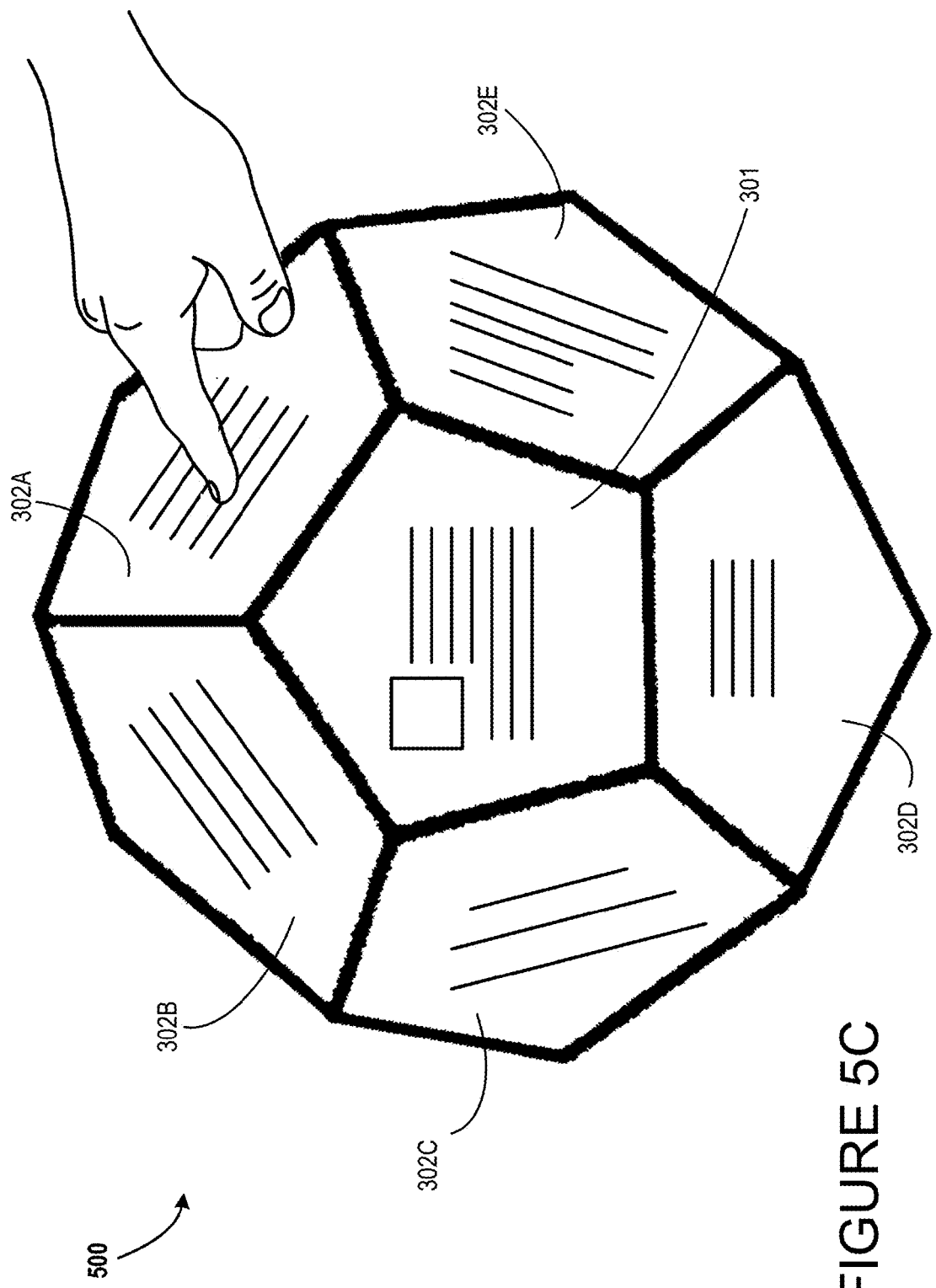
Figure 5D:
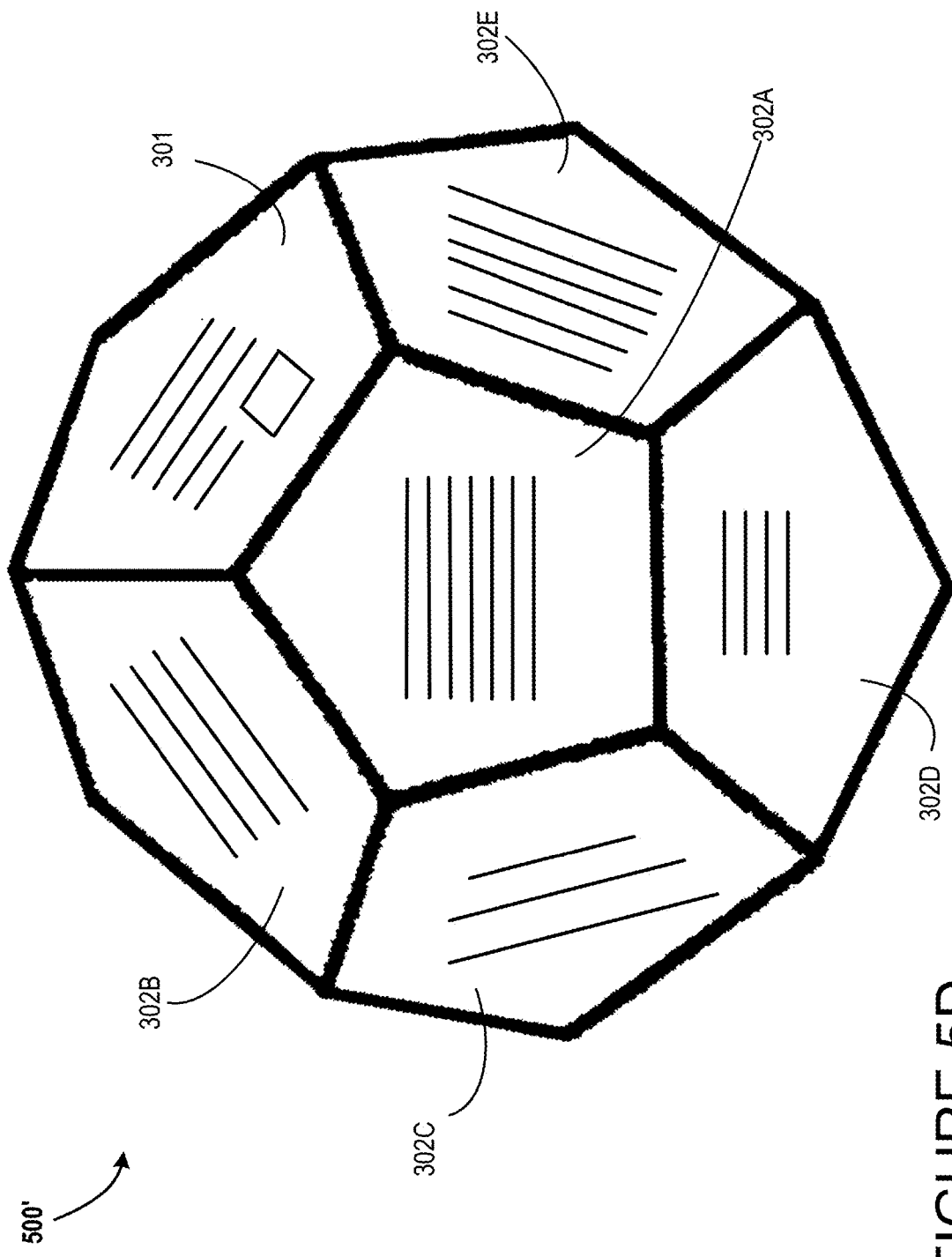

As summarized above, a user input or other command can cause a display of a graphical element to rotate or change in order for the user to see different surfaces. To illustrate this aspect, FIG. 5C illustrates a user input with respect to a touchscreen user interface. In this illustrative example, the user is selecting the second service to view the contents 302A of the first digital card side. In response to the input, a device 108 can change the form of the graphical element 500 to display the contents 302A of the first digital card side in the center of the graphical element 500. At the same time, the contents 301 of the digital card is shifted to a surface on the upper right corner of the graphical element 500. An example of a modified graphical element 500' is shown in FIG. 5D. This example is provided for illustrative purposes and is not to be construed as limiting. Instead of shifting the contents of the digital card and the digital card sides, a device 108 controlling the display of the graphical element 500 can show selected content by rotating the graphical element 500, enlarging surface of a graphical element 500, changing orientations of the graphical element 500, and/or changing display properties of the graphical element 500.

Turning now to FIG. 6, techniques for merging collectible data structures to generate a merged data structure is shown and described below. In some configurations, a device 108 can receive data defining a first collectable data structure 601 and a second collectable data structure 602. In this example, the first collectible data structure can define a first object and attributes associated with the first object, and the second collectible data structure can define a second object and attributes associated with the second object. For illustrative purposes, the first collectible data structure 601 and the second collectible data structure 602 are generically referred to herein as "original data structures."

The device 108 can receive or generate a request to merge the first collectable data structure 601 and the second collectable data structure 602. In response to receiving the request, a device 108 can generate a third collectable data structure 603, e.g., a merged data structure, defining a third object and attributes related to the third object. In some configurations, the third object is based, at least in part, on the first object and the second object. In addition, attributes associated with the third object can be based, at least in part, on the attributes of the first and second objects. The generation of the third collectible data structure 603 can be based on a set of rules or instructions. For instance, a rule can indicate that attributes defining graphical features of the original data structures can be preserved for the merged data structure. In such an example, certain colors, insignia, or graphical features indicating a status may be preserved. Rules may preserve and/or change colors, images, and other aspects of an object and/or attributes of the original data structures. These examples are provided for illustrative purposes and are not to be construed as limiting. It can be appreciated that any rule or instruction for merging data structures can be applied to the techniques disclosed herein.

Figure 7A:
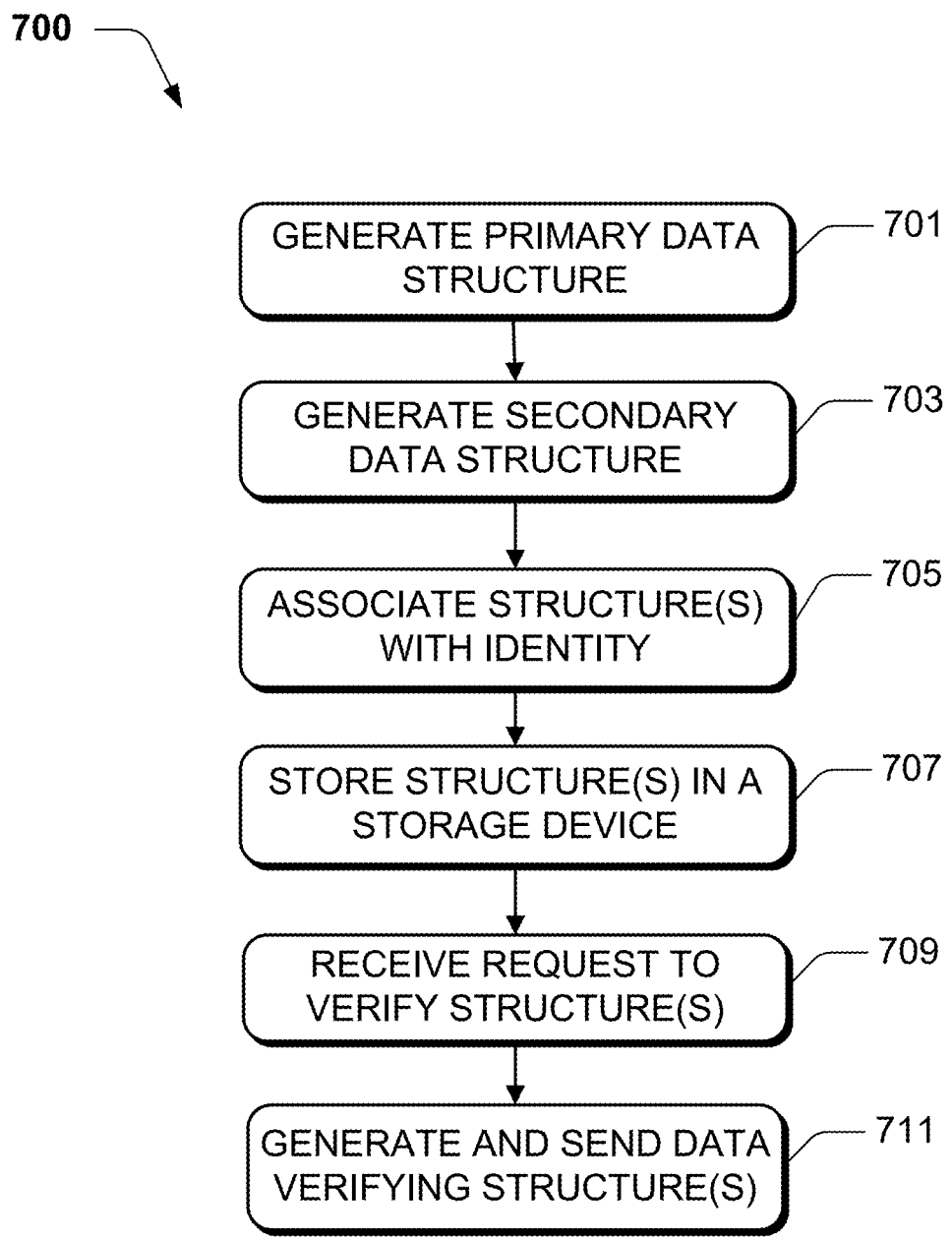
FIG. 7A illustrates a routine for generating and verifying collectable data structures.
Figure 7B:
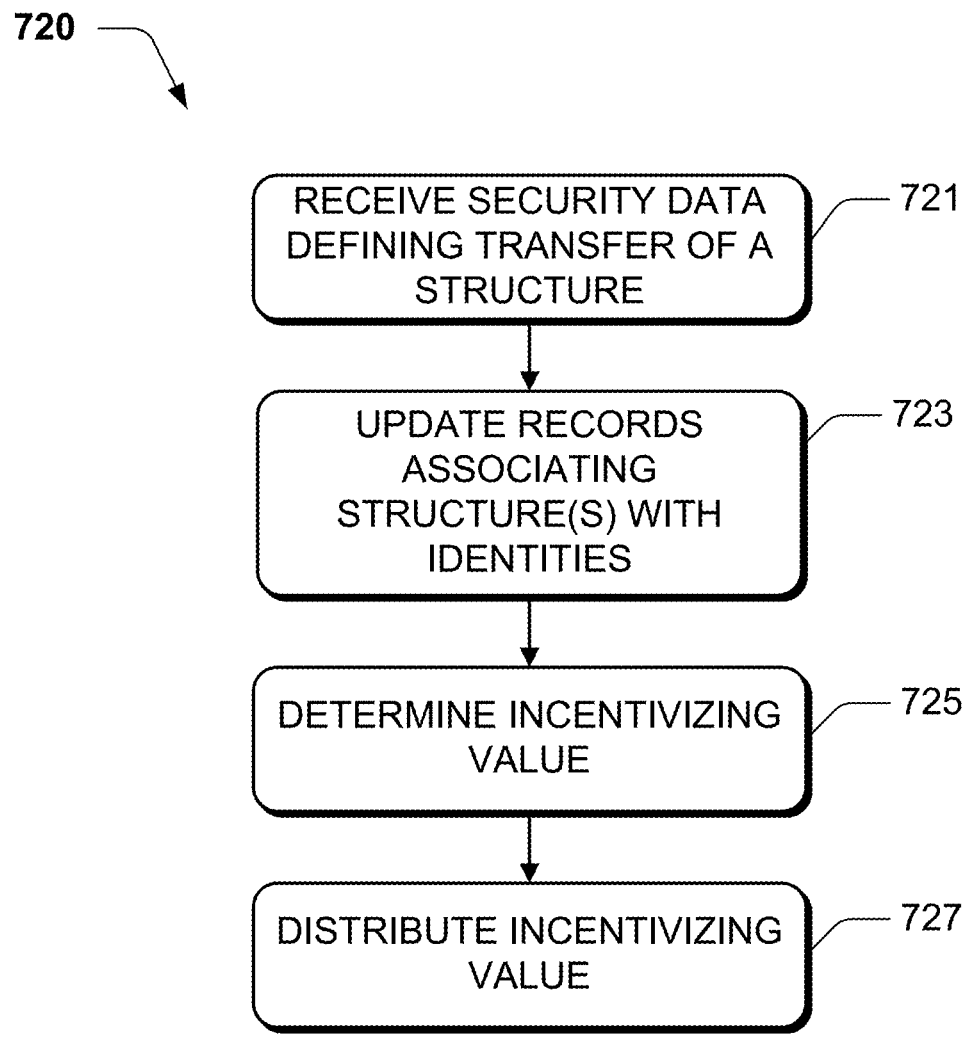
FIG. 7B illustrates an example routine for transferring collectable data structures.
Figure 7C:
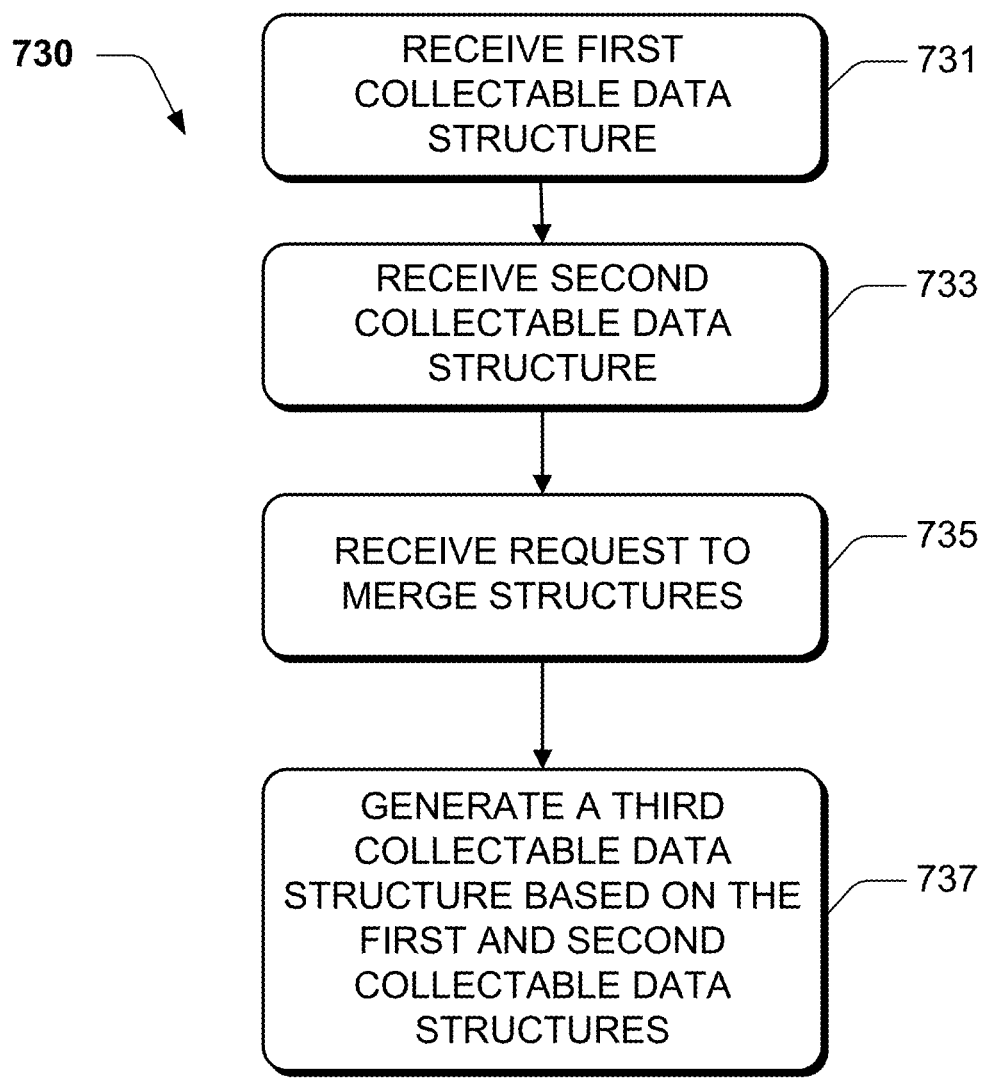
FIG. 7C illustrates an example routine for merging collectable data structures.
Figure 7D:
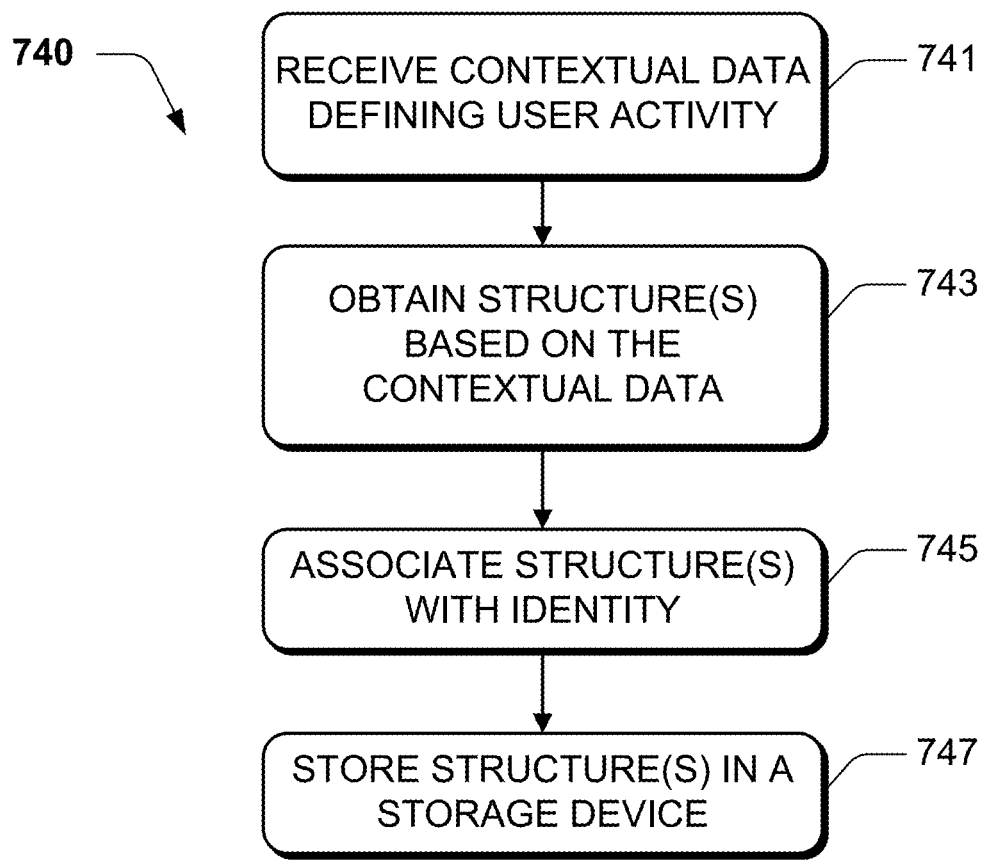
FIG. 7D illustrates an example routine for generating and communicating collectable data structures based on user activity.
Figure 8:
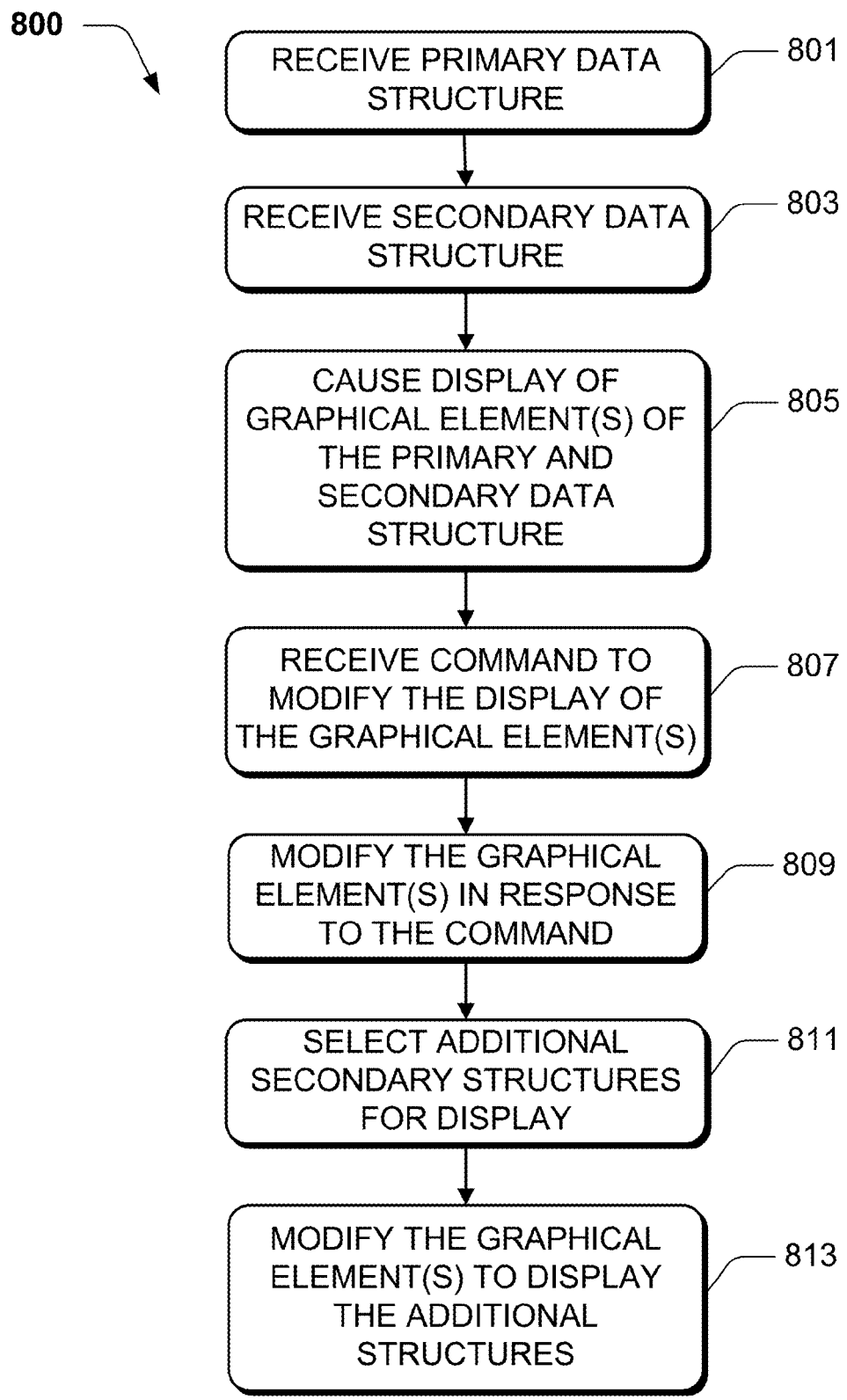
FIG. 8 illustrates an example routine for displaying collectable data structures.

Turning now to FIG. 7A through FIG. 8, aspects of several routines for processing collectable data structures are shown and described below. Specifically, FIG. 7A illustrates a routine 700 for generating and verifying collectable data structures. FIG. 7B illustrates a routine 720 for transferring collectable data structures. FIG. 7C illustrates a routine 730 for merging collectable data structures. FIG. 7D illustrates a routine 740 for distributing collectable data structures based on user activity. FIG. 8 illustrates a routine 800 for displaying collectable data structures.

It should be understood that the operations of the routines disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. For example, the processing of a collectible data structure can either mean the processing of a digital card 120 or a digital card side 121. The techniques that apply to digital card 120 can also apply to a digital card side 121 and vice versa. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routines are described herein as being implemented, at least in part, by a component and/or circuit, such as one or more modules of a device 108 or one or more modules of a service, such as the application store 104. In some configurations, the one or more modules can utilize a dynamically linked library (DLL), a statically linked library, functionality enabled by an application programing interface (API), a compiled program, an interpreted program, a script or any other executable set of instructions. The contextual data 123, collectable data structure, or other data received by the one or more modules can be stored in a data structure in one or more memory components. The data can be retrieved from the data structure by addressing links or references to the data structure.

Figure 9:
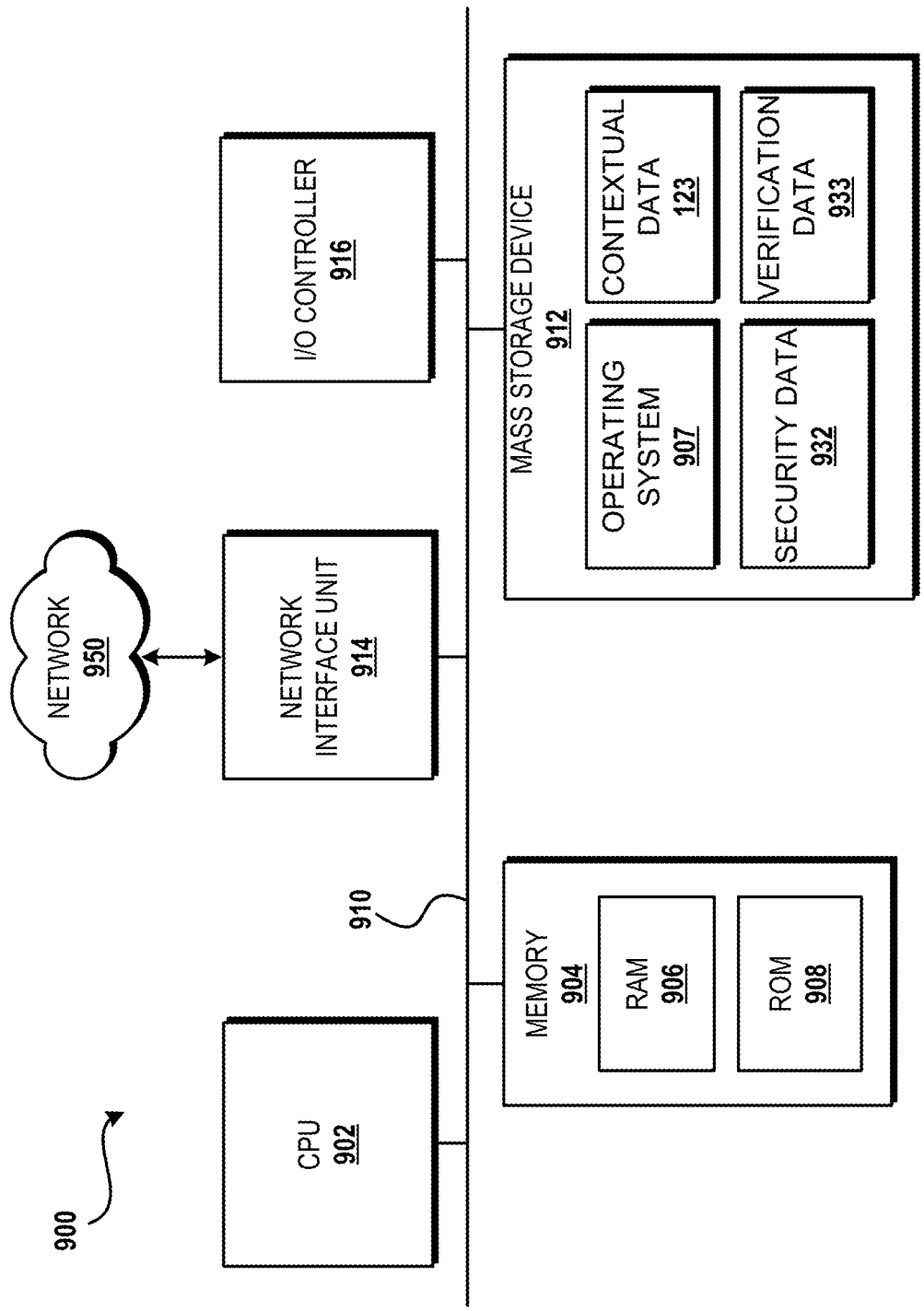
FIG. 9 is a computer architecture diagram illustrating an illustrative computer hardware and software architecture for a computing system capable of implementing aspects of the techniques and technologies presented herein.
Figure 10:
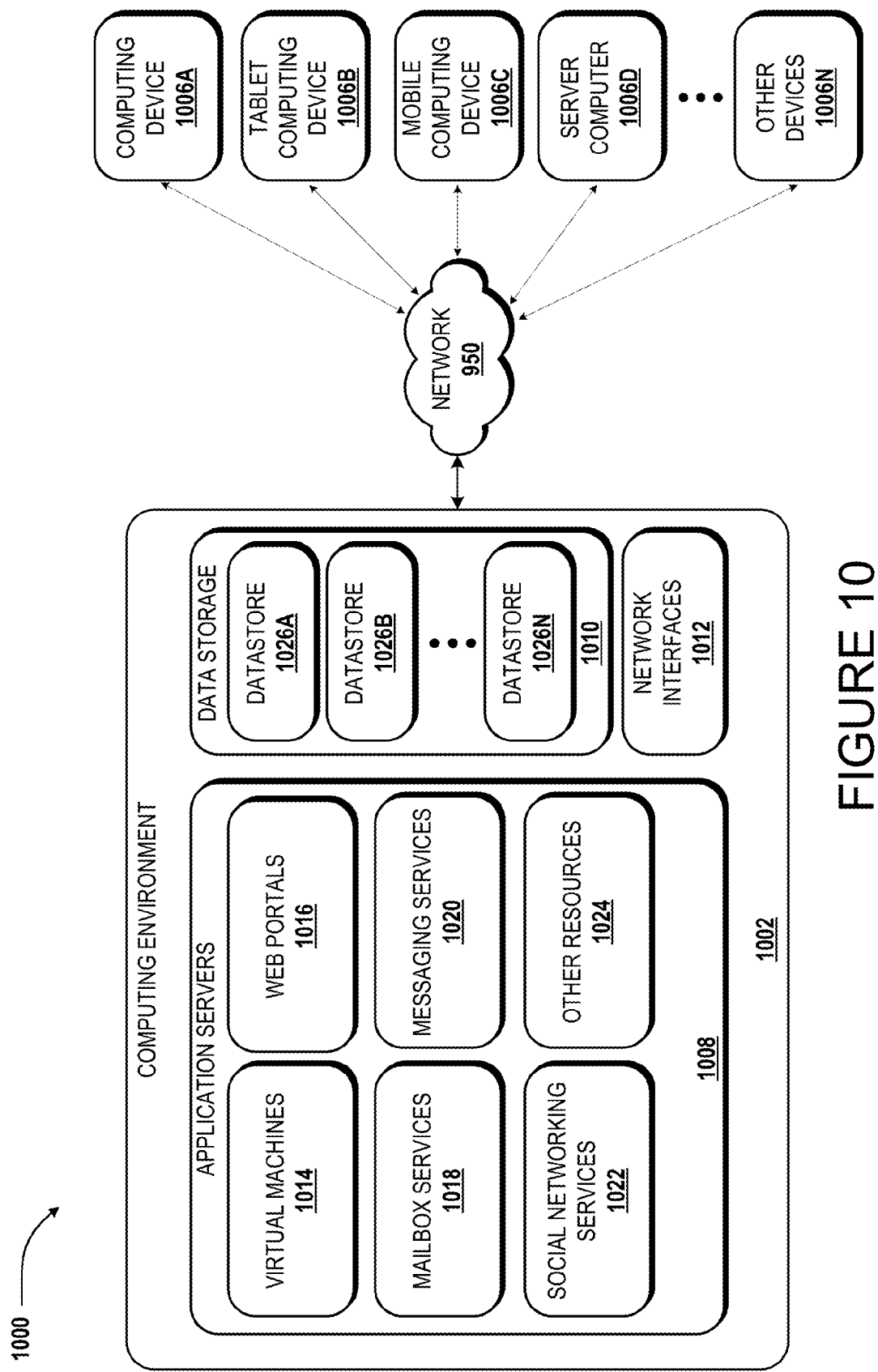
FIG. 10 is a diagram illustrating a distributed computing environment capable of implementing aspects of the techniques and technologies presented herein.

Although the following illustration refers to the components of FIG. 9 through FIG. 11, it can be appreciated that the operations of the routines may be also implemented in many other ways. For example, the routines may be implemented, at least in part, by a processor of another remote computer or a local circuit. In addition, one or more of the operations of the routines may alternatively or additionally be implemented, at least in part, by a chipset working alone or in conjunction with other hardware components utilizing software modules.

With reference to FIG. 7A, the routine 700 for generating collectable data structures begins at operation 701, where one or more modules cause the generation of a primary data structure defining a centralized object, at least one attribute associated with the centralized object, and a primary security key. In such configurations, among other features described herein, the centralized object can represent a person, item, or location. For instance, the centralized object can represent a character of a game, a sports figure, etc. The primary data structure can also define attributes, which can include characteristics, items, locations, or properties related to the centralized object. In some configurations, the primary data structure can store content related to the centralized object and the attributes in the form of text data, image data, audio data, video data, metadata, and/or any other suitable data format. The primary security key of the primary data structure can include any suitable form of security data configured to enable a device 108 to verify the authenticity and/or the source of the primary data structure.

At operation 703, one or more modules can cause the generation of a secondary data structure defining a dependent object, an attribute associated with the dependent object, and a secondary security key. In some configurations, among other features described herein, the secondary data structure can include aspects that are dependent on the primary data structure. For example, the dependent object of the dependent data structure can define an item, such as a weapon or a magical spell, which can only be utilized by the centralized object of a particular primary data structure. One or more dependencies between a primary data structure and dependent data structure can be defined by the attributes and/or one or more security keys. The primary data structure and/or the dependent data structure can also define graphical elements for rendering a digital card 120 and/or a digital card side 121 on a display interface. For illustrative purposes, the digital card 120 and/or the digital card side 121 are referred to herein as "structure(s)."

At operation 705, one or more modules can cause the generation of data defining an association between an identity and the structure(s), e.g., the primary data structure and/or the dependent data structure. As summarized above, an identity can be associated with an organization, individual, company, machine, system, service, device, or any other entity that utilizes at least one identity to store and process data. An identity, for example, may be associated with a user account, smart card, certificate or any other form of authentication. A record defining the association between the structure(s) and the identity can be stored in a database, including a publically controlled database utilizing sequential transaction chains. In some configurations, a database record or a database entry can associate an identifier or security key of the structure(s) with an identity.

At operation 707, one or more modules can cause a storage of the structure(s) in one or more storage devices. The techniques associated with operation 707 can enable devices and/or associated identities to control the possession of a collectable data structure. For instance, the card 120 or the side 121 can be stored in the storage device that is part of a system or service, such as the application store 104. In some configurations, the storage device can be part of a user device 108, or a component of a remote storage service, such as ONEDRIVE or GOOGLE DRIVE. In some configurations, a storage device containing the structure(s) can be configured to provide controlled access to a user or entity associated with the identity processed in operation 705.

At operation 709, one or more modules can cause a device to receive a request to verify the authenticity and/or a source of one or more structures. Since the collectible data structures described herein are autonomous data structures that can be transferred from user to user, or device to device, the techniques disclosed herein allow users of devices to determine if a particular collectible data structure is authentic or if a particular collectible data structure is from a particular source, such as an application store 104. In some configurations, a request may include an identifier, a security key or any other data suitable for identifying a particular collectible data structure.

At operation 711, one or more modules can cause the generation and communication of data confirming the authenticity and/or a source of one or more collectible data structures. Based on the identifier, security key, and/or other data included in the request, the one or more modules can execute one or more instructions to generate a query to a database. The query can be configured with data included in the request, and the query can cause a database to retrieve data verifying that the structure(s) identified in the request is associated with a particular identity and/or security key. If it is determined that the structure(s) identified in the request matches an identifier or structure in one or more database records, the one or more modules can cause the generation and communication of data confirming the authenticity and/or the source of the structure(s). As noted above, portions of the routine 700 can be utilized as a stand-alone process. For instance, operation 709 and operation 711 can be initiated by any computing device requesting data confirming the authenticity and/or the source of the structure(s). Such operations can be initiated at any time or based on any other suitable user activity.

Turning now to FIG. 7B, the routine 720 for transferring collectable data structures is shown and described below. To illustrate aspects of the routine 720, consider the example shown in FIG. 1B. In this example, one or more structure(s), e.g., the digital card 120 and/or the digital card side 121, are transferred from the first user device 108A associated with the first user 110A to the second user device 108B associated with the second user 110B.

The routine 720 begins at operation 721 where one or more modules cause a device to receive a request to transfer a collectable data structure. The request can be received by a service, such as the application store manager 119 or the service provider server 220. The request can be generated by one or more devices 108 controlled by users desiring the transfer of a collectable data structure. The request can contain an identifier or security key of the structure(s) to be transferred, an identity of the first user 110A conveying the structure(s), and an identity of the second user 110B receiving the structure(s). The request can also indicate some form of consideration that can be exchanged as part of the transfer.

Next, at operation 723, one or more modules can cause a device to update one or more database records based on the request. In the present example, if a record of a database associates the structure(s) with an identity of the first user 110A, operation 723 can modify the record to associate the structure(s) with an identity of the second user 110B. In a scenario where a sequential transaction chain is used, a subsequent block can be generated based on the parameters of the transfer. For instance, a subsequent block can define an identifier of the structure(s), define an identity of the first user 110A as the conveying party, and define an identity of the second user 110B as the recipient party. A database record can also identify one or more devices sending and/or receiving the structure(s).

In operation 725, one or more modules can cause a device to determine an incentivizing value based on the request. As summarized above, the transfer of collectable data structures can involve the generation of data defining an incentivizing value, which may include a reward, commission, points, or any other incentivizing allocation to a service, server or device associated with an identity. The incentivizing value can be based on the consideration defined in the request or based on any data defining a transaction associated with the transfer of the structure(s).

Next, in operation 727, the data defining the incentivizing value is distributed to one or more devices. For example, the incentivizing value can be issued to one or more systems, such as an application store 104. In the configuration where the service provider server 220 is utilized, the incentivizing value can be determined and generated by the service provider server 220, and the service provider server 220 can distribute portions of the incentivizing value to other devices. In some configurations, the portions of the incentivizing value can be divided and distributed to one or more miner devices 280 based on a proportion of contribution of hash functions they provide to one or more databases.

Referring now to FIG. 7C, a routine 730 for merging collectable data structures is shown and described. As summarized above, techniques disclosed herein enable a merger of two or more collectible data structures to generate a merged data structure. The routine 730 is described below in conjunction with the diagram illustrated in FIG. 6.

As shown, the routine 730 begins at operation 731 where one or more modules receive or generate a first collectible data structure 601. The first collectible data structure 601 can include a digital card 120 or a digital card side 121. The first collectible data structure 601 can define a first object and attributes related to the first object. Similarly, at operation 733, the device can receive or generate a second collectible data structure 602. The second collectible data structure 602 can include a digital card 120 or a digital card side 121. Similarly, the second collectible data structure 602 can define a second object and attributes related to the second object. It can be appreciated that the data structures received or generated in operation 731 or operation 733 can include other items such as a security key, identifier and other items described above.

Next, at operation 735, one or more modules receive a request to merge the first collectable data structure 601 and the second collectable data structure 602. A request may include the appropriate identifiers for collectible data structures to be merged. It can be appreciated that the request may identify two or more collectible data structures, and that the techniques disclosed herein can involve a merger of two or more collectible data structures. The request can be initiated by a user or an application, such as a game or a component of an operating system.

Next, at operation 737, in response to receiving the request, one or more modules can generate a third collectable data structure 603, e.g., a merged data structure, defining a third object and attributes related to the third object. In some configurations, the third object is based, at least in part, on the first object and the second object. In addition, attributes associated with the third object can be based, at least in part, on the attributes of the first and second objects. The generation of the third collectible data structure 603 can be based on a set of rules or instructions. For instance, a rule may indicate that attributes defining graphical features of the original data structures can be preserved and/or modified for the merged data structure. New objects and attributes can be added to the merged data structure, and in some cases, new objects and attributes can be added based on received contextual data 123. Although this example illustrates the merger of two collectible data structures, it can be appreciated that the techniques disclosed herein can also apply to a merger of three or more collectible data structures.

Referring now to FIG. 7D, a routine 740 for distributing collectable data structures based on user activity is shown and described. As summarized above, techniques disclosed herein enable a system to interpret user activity and take a number of different actions based on the user activity. In an illustrative routine described herein, user activity is interpreted by a system to issue a collectible data structure to a user. With reference to an example described above, a system can collect contextual data 123 from a number of systems, including a gaming device and an e-commerce store. The system can, for example, issue a collectible data structure to reward a user based on achievements made in a game or other activity such as purchases made at a store.

The routine 740 begins at operation 741, where one or more modules receive contextual data 123 defining user activity. As described herein, the contextual data 123 can be received from a number of resources, including a gaming device, e-commerce store, an email system, a social networking platform, and other platforms, servers, or services some of which are shown in FIG. 10.

Next, at operation 743, one or more modules obtain one or more collectible data structures based on the received contextual data 123. In operation 743, the collectible data structures can be generated using the techniques disclosed herein, which may include the generation of a digital card 120 or a digital card side 121. In some configurations, collectible data structures can be obtained from one or more storage devices. In some configurations, the selection of the collectible data structure can be based on one or more rules or instructions. For example, if a system is configured to issue a particular digital card based on a particular set of user activity, that particular digital card may be obtained in operation 743 if the received contextual data 123 identifies that particular set of user activity.

Next, at operation 745, one or more modules can generate one or more database records associating the obtained collectable data structures with one or more identities. As described above, the storage of data associating the collectible data structure with one or more identities enables remote systems and devices to verify the authenticity and/or the source of the collectible data structures. In some configurations, operation 745 may involve a process of storing a private key associated with the one or more collectible data structures. The storage of private key or other security data related to the one or more collectible data structures enables remote devices and systems to verify the authenticity and/or the source of the collectible data structures.

Next, at operation 747, one or more modules can store the one or more collectible data structures in a storage device. Among the various techniques disclosed herein, operation 747 can involve a process of storing collectible data structures in a storage device associated with a service, such as the application store 104, or a storage device of a computer associated with the user.

Referring now to FIG. 8, the routine 800 for displaying collectable data structures is shown and described below. As described above, techniques disclosed herein enable a device to display one or more collectible data structures using graphical elements rendered on a display device. The routine 800 begins at operation 801, where one or more modules receive a primary data structure. As summarized above, a primary data structure can define a centralized object and attributes related to the centralized object. It can be appreciated that the primary data structure can define other items such as a security key, identifier, and/or other data.

At operation 803, the one or more modules can receive a secondary data structure. As also summarized above, a secondary data structure can define a dependent object and attributes related to the dependent object. The secondary data structure can also define other items such as a security key, identifier, and other data. One or more aspects of the secondary data structure can depend on one or more aspects of the primary data structure. In some configurations, the utilization of the secondary data structure can be restricted unless a device can verify the possession of the primary data structure. Both the primary data structure and the secondary data structure can include attributes defining display features, which may include image data and other data defining graphical elements.

Next, at operation 805, one or more modules cause the display of one or more graphical elements containing content of the primary data structure and the secondary data structure. As summarized above, a display of the contents of a primary data structure and a secondary data structure can involve a single graphical element or a number of graphical elements. An example of a single graphical element is shown in FIG. 5B, and an example of a number of graphical elements is shown in FIG. 3A.

Next, at operation 807, one or more modules can receive a command to modify the display of the one or more graphical elements. For instance, a user may provide an input to rotate or manipulate a single graphical element to view various surfaces displaying the contents of a particular data structure. As shown in the example of FIG. 5C, a user can select a particular service causing the display to rotate or transform a graphical element. The command to modify the display of the one or more graphical elements can also be received from other resources, such as a game, operating system, and/or a service.

At operation 809, responsive to the command received at operation 807, one or more modules can modify the display of one or more graphical elements. As described herein, one or more graphical elements can be rotated, transformed, or otherwise processed to display one or more surfaces. In some configurations, one or more graphical elements can be rotated, transformed, or otherwise processed based on the received command.

At operation 811, one or more modules can select additional secondary data structures for display. For example, the device can receive a number of digital card sides 121. As described herein, the additional secondary data structures can be obtained by a transaction performed with a resource, such as the application store 104, or another device transferring the additional secondary data structures. Once additional secondary data structures are received, they can be selected for display. The selection of one or more additional secondary data structures can be based on a number of commands from one or more resources, such as a game application, a productivity application, an AutoCAD application, and/or an operating system.

Next, at operation 813, one or more modules can modify one or more graphical elements to accommodate the additional secondary data structures. One example can include the addition of graphical elements, such as those shown in FIG. 3A. In such an example, individual graphical elements can be generated to display the contents of each additional secondary data structure. In another example, as shown in FIG. 5A and FIG. 5B, the form of one graphical element 500 can transform as additional secondary data structures are received and/or selected for display. In the example of FIG. 5A, the graphical element 500 begins with two sides. As other secondary data structures are received and/or selected, the graphical element 500 can transform into an object having additional sides. This example is provided for illustrative purposes and is not to be construed as limiting. It can be appreciated that a single graphical element may have any number of sides to accommodate any number of secondary data structures.

FIG. 9 shows additional details of an example computer architecture 900 for a computer, such as the computing devices 108, service provider server 220, application store manager 119 capable of executing the program components described above for providing a mixed environment display of attached control elements. Thus, the computer architecture 900 illustrated in FIG. 9 illustrates an architecture for a server computer, mobile phone, an HMD, a PDA, a smart phone, a desktop computer, a netbook computer, a tablet computer, and/or a laptop computer. The computer architecture 900 may be utilized to execute any aspects of the software components presented herein.

The computer architecture 900 illustrated in FIG. 9 includes a central processing unit 902 ("CPU"), a system memory 904, including a random access memory 906 ("RAM") and a read-only memory ("ROM") 908, and a system bus 910 that couples the memory 904 to the CPU 902. A basic input/output system containing the basic routines that help to transfer information between elements within the computer architecture 900, such as during startup, is stored in the ROM 908. The computer architecture 900 further includes a mass storage device 912 for storing an operating system 907, and one or more application programs including, but not limited to, contextual data 123, security data 932, and verification data 933.

The mass storage device 912 is connected to the CPU 902 through a mass storage controller (not shown) connected to the bus 910. The mass storage device 912 and its associated computer-readable media provide non-volatile storage for the computer architecture 900. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, the computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. For purposes the claims, the phrase "computer storage medium," "computer-readable storage medium" and variations thereof, does not include waves, signals, and/or other transitory and/or intangible communication media, per se.

According to various configurations, the computer architecture 900 may operate in a networked environment using logical connections to remote computers through the network 950 and/or another network (not shown). The computer architecture 900 may connect to the network 950 through a network interface unit 914 connected to the bus 910. It should be appreciated that the network interface unit 914 also may be utilized to connect to other types of networks and remote computer systems. The computer architecture 900 also may include an input/output controller 916 for receiving and processing input from a number of other devices, including a keyboard, mouse, or electronic stylus (not shown in FIG. 9). Similarly, the input/output controller 916 may provide output to a display screen, a printer, or other type of output device (also not shown in FIG. 9).

It should be appreciated that the software components described herein may, when loaded into the CPU 902 and executed, transform the CPU 902 and the overall computer architecture 900 from a general-purpose computing system into a special-purpose computing system customized to facilitate the functionality presented herein. The CPU 902 may be constructed from any number of transistors or other discrete circuit elements, which may individually or collectively assume any number of states. More specifically, the CPU 902 may operate as a finite-state machine, in response to executable instructions contained within the software modules disclosed herein. These computer-executable instructions may transform the CPU 902 by specifying how the CPU 902 transitions between states, thereby transforming the transistors or other discrete hardware elements constituting the CPU 902.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 900 in order to store and execute the software components presented herein. It also should be appreciated that the computer architecture 900 may include other types of computing devices, including hand-held computers, embedded computer systems, personal digital assistants, and other types of computing devices known to those skilled in the art. It is also contemplated that the computer architecture 900 may not include all of the components shown in FIG. 9, may include other components that are not explicitly shown in FIG. 9, or may utilize an architecture completely different than that shown in FIG. 9.

FIG. 10 depicts an illustrative distributed computing environment 1000 capable of executing the software components described herein for providing a mixed environment display of attached control elements, among other aspects. Thus, the distributed computing environment 1000 illustrated in FIG. 10 can be utilized to execute any aspects of the software components presented herein. For example, the distributed computing environment 1000 can be utilized to execute aspects of the techniques disclosed herein.

According to various implementations, the distributed computing environment 1000 includes a computing environment 1002 operating on, in communication with, or as part of the network 950. The network 950 also can include various access networks. One or more client devices 1006A-1006N (hereinafter referred to collectively and/or generically as "clients 1006") can communicate with the computing environment 1002 via the network 1004 and/or other connections (not illustrated in FIG. 10). In one illustrated configuration, the clients 1006 include a computing device 1006A such as an HMD, a laptop computer, a desktop computer, or other computing device; a slate or tablet computing device ("tablet computing device") 1006B; a mobile computing device 1006C such as a mobile telephone, a smart phone, or other mobile computing device; a server computer 1006D; and/or other devices 1006N. It should be understood that any number of clients 1006 can communicate with the computing environment 1002. It should be understood that the illustrated clients 1006 and computing architectures illustrated and described herein are illustrative, and should not be construed as being limited in any way.

In the illustrated configuration, the computing environment 1002 includes application servers 1008, data storage 1010, and one or more network interfaces 1012. According to various implementations, the functionality of the application servers 1008 can be provided by one or more server computers that are executing as part of, or in communication with, the network 1004. The application servers 1008 can host various services, virtual machines, portals, and/or other resources. In the illustrated configuration, the application servers 1008 host one or more virtual machines 1014 for hosting applications or other functionality. According to various implementations, the virtual machines 1014 host one or more applications and/or software modules for providing a mixed environment display of attached control elements. It should be understood that this configuration is illustrative, and should not be construed as being limiting in any way. The application servers 1008 also host or provide access to one or more portals, link pages, Websites, and/or other information ("Web portals") 1016.

According to various implementations, the application servers 1008 also include one or more mailbox services 1018 and one or more messaging services 1020. The mailbox services 1018 can include electronic mail ("email") services. The mailbox services 1018 also can include various personal information management ("PIM") services including, but not limited to, calendar services, contact management services, collaboration services, and/or other services. The messaging services 1020 can include, but are not limited to, instant messaging services, chat services, forum services, and/or other communication services.

The application servers 1008 also may include one or more social networking services 1022. The social networking services 1022 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 1022 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 1022 are provided by other services, sites, and/or providers that may or may not be explicitly known as social networking providers. For example, some Websites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Washington. Other services are possible and are contemplated.

The social networking services 1022 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 1022 are not mentioned herein for the sake of brevity. As such, the above configurations are illustrative, and should not be construed as being limited in any way. According to various implementations, the social networking services 1022 may host one or more applications and/or software modules for providing the functionality described herein for providing a mixed environment display of attached control elements. For instance, any one of the application servers 1008 may communicate or facilitate the functionality and features described herein. For instance, a social networking application, mail client, messaging client, a browser running on a phone or any other client 1006 may communicate with a networking service 1022 and facilitate the functionality, even in part, described above with respect to FIG. 6.

As shown in FIG. 10, the application servers 1008 also can host other services, applications, portals, and/or other resources ("other resources") 1024. The other resources 1024 can include, but are not limited to, document sharing, rendering or any other functionality. It thus can be appreciated that the computing environment 1002 can provide integration of the concepts and technologies disclosed herein provided herein with various mailbox, messaging, social networking, and/or other services or resources.

As mentioned above, the computing environment 1002 can include the data storage 1010. According to various implementations, the functionality of the data storage 1010 is provided by one or more databases operating on, or in communication with, the network 1004. The functionality of the data storage 1010 also can be provided by one or more server computers configured to host data for the computing environment 1002. The data storage 1010 can include, host, or provide one or more real or virtual data stores 1026A-1026N (hereinafter referred to collectively and/or generically as "data stores 1026"). The data stores 1026 are configured to host data used or created by the application servers 1008 and/or other data. Although not illustrated in FIG. 10, the data stores 1026 also can host or store web page documents, word processor documents, presentation documents, data structures, algorithms for execution by a recommendation engine, and/or other data utilized by any application program or another module, such as the content manager 105. Aspects of the data stores 1026 may be associated with a service for storing files.

The computing environment 1002 can communicate with, or be accessed by, the network interfaces 1012. The network interfaces 1012 can include various types of network hardware and software for supporting communications between two or more computing devices including, but not limited to, the clients 1006 and the application servers 1008. It should be appreciated that the network interfaces 1012 also may be utilized to connect to other types of networks and/or computer systems.

It should be understood that the distributed computing environment 1000 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1000 provides the software functionality described herein as a service to the clients 1006. It should be understood that the clients 1006 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1000 to utilize the functionality described herein for providing a mixed environment display of attached control elements, among other aspects. In one specific example, as summarized above, techniques described herein may be implemented, at least in part, by the operating system 907 of FIG. 9, which works in conjunction with the application servers 1008 of FIG. 10.

Turning now to FIG. 11, an illustrative computing device architecture 1100 for a computing device that is capable of executing various software components described herein for providing a mixed environment display of attached control elements. The computing device architecture 1100 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1100 is applicable to any of the clients 1006 shown in FIG. 10. Moreover, aspects of the computing device architecture 1100 may be applicable to traditional desktop computers, portable computers (e.g., laptops, notebooks, ultra-portables, and netbooks), server computers, and other computer systems, such as those described herein. For example, the single touch and multi-touch aspects disclosed herein below may be applied to desktop computers that utilize a touchscreen or some other touch-enabled device, such as a touch-enabled track pad or touch-enabled mouse.

The computing device architecture 1100 illustrated in FIG. 11 includes a processor 1102, memory components 1104, network connectivity components 1106, sensor components 1108, input/output components 1112, and power components 1112. In the illustrated configuration, the processor 1102 is in communication with the memory components 1104, the network connectivity components 1106, the sensor components 1108, the input/output ("I/O") components 1110, and the power components 1112. Although no connections are shown between the individuals components illustrated in FIG. 11, the components can interact to carry out device functions. In some configurations, the components are arranged so as to communicate via one or more busses (not shown).

The processor 1102 includes a central processing unit ("CPU") configured to process data, execute computer-executable instructions of one or more application programs, and communicate with other components of the computing device architecture 1100 in order to perform various functionality described herein. The processor 1102 may be utilized to execute aspects of the software components presented herein and, particularly, those that utilize, at least in part, a touch-enabled input.

In some configurations, the processor 1102 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1030P, and higher resolution), video games, three-dimensional ("3D") modeling applications, and the like. In some configurations, the processor 1102 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 1102 is, or is included in, a system-on-chip ("SoC") along with one or more of the other components described herein below. For example, the SoC may include the processor 1102, a GPU, one or more of the network connectivity components 1106, and one or more of the sensor components 1108. In some configurations, the processor 1102 is fabricated, in part, utilizing a package-on-package ("PoP") integrated circuit packaging technique. The processor 1102 may be a single core or multi-core processor.

The processor 1102 may be created in accordance with an ARM architecture, available for license from ARM HOLDINGS of Cambridge, United Kingdom. Alternatively, the processor 1102 may be created in accordance with an x86 architecture, such as is available from INTEL CORPORATION of Mountain View, California and others. In some configurations, the processor 1102 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1104 include a random access memory ("RAM") 1114, a read-only memory ("ROM") 1116, an integrated storage memory ("integrated storage") 1118, and a removable storage memory ("removable storage") 1120. In some configurations, the RAM 1114 or a portion thereof, the ROM 1116 or a portion thereof, and/or some combination the RAM 1114 and the ROM 1116 is integrated in the processor 1102. In some configurations, the ROM 1116 is configured to store a firmware, an operating system or a portion thereof (e.g., operating system kernel), and/or a bootloader to load an operating system kernel from the integrated storage 1118 and/or the removable storage 1120.

The integrated storage 1118 can include a solid-state memory, a hard disk, or a combination of solid-state memory and a hard disk. The integrated storage 1118 may be soldered or otherwise connected to a logic board upon which the processor 1102 and other components described herein also may be connected. As such, the integrated storage 1118 is integrated in the computing device. The integrated storage 1118 is configured to store an operating system or portions thereof, application programs, data, and other software components described herein.

The removable storage 1120 can include a solid-state memory, a hard disk, or a combination of solid-state memory and a hard disk. In some configurations, the removable storage 1120 is provided in lieu of the integrated storage 1118. In other configurations, the removable storage 1120 is provided as additional optional storage. In some configurations, the removable storage 1120 is logically combined with the integrated storage 1118 such that the total available storage is made available as a total combined storage capacity. In some configurations, the total combined capacity of the integrated storage 1118 and the removable storage 1120 is shown to a user instead of separate storage capacities for the integrated storage 1118 and the removable storage 1120.

The removable storage 1120 is configured to be inserted into a removable storage memory slot (not shown) or other mechanism by which the removable storage 1120 is inserted and secured to facilitate a connection over which the removable storage 1120 can communicate with other components of the computing device, such as the processor 1102. The removable storage 1120 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1104 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, BLACKBERRY OS from Research In Motion Limited of Waterloo, Ontario, Canada, IOS from Apple Inc. of Cupertino, California, and ANDROID OS from Google Inc. of Mountain View, Calif. Other operating systems are contemplated.

The network connectivity components 1106 include a wireless wide area network component ("WWAN component") 1122, a wireless local area network component ("WLAN component") 1124, and a wireless personal area network component ("WPAN component") 1126. The network connectivity components 1106 facilitate communications to and from the network 1156 or another network, which may be a WWAN, a WLAN, or a WPAN. Although only the network 1156 is illustrated, the network connectivity components 1106 may facilitate simultaneous communication with multiple networks, including the network 1156 of FIG. 11. For example, the network connectivity components 1106 may facilitate simultaneous communications with multiple networks via one or more of a WWAN, a WLAN, or a WPAN.

The network 1156 may be or may include a WWAN, such as a mobile telecommunications network utilizing one or more mobile telecommunications technologies to provide voice and/or data services to a computing device utilizing the computing device architecture 1100 via the WWAN component 1122. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 950 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 950 may be configured to provide voice and/or data communications with any combination of the above technologies. The network 950 may be configured to or adapted to provide voice and/or data communications in accordance with future generation technologies.

In some configurations, the WWAN component 1122 is configured to provide dual- multi-mode connectivity to the network 1150. For example, the WWAN component 1122 may be configured to provide connectivity to the network 1150, wherein the network 1150 provides service via GSM and UMTS technologies, or via some other combination of technologies. Alternatively, multiple WWAN components 1122 may be utilized to perform such functionality, and/or provide additional functionality to support other non-compatible technologies (i.e., incapable of being supported by a single WWAN component). The WWAN component 1122 may facilitate similar connectivity to multiple networks (e.g., a UMTS network and an LTE network).

The network 950 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1124 is configured to connect to the network 950 via the WI-FI access points. Such connections may be secured via various encryption technologies including, but not limited, WI-FI Protected Access ("WPA"), WPA2, Wired Equivalent Privacy ("WEP"), and the like.

The network 950 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1126 is configured to facilitate communications with other devices, such as peripherals, computers, or other computing devices via the WPAN.

The sensor components 1108 include a magnetometer 1128, an ambient light sensor 1130, a proximity sensor 1132, an accelerometer 1134, a gyroscope 1136, and a Global Positioning System sensor ("GPS sensor") 1138. It is contemplated that other sensors, such as, but not limited to, temperature sensors or shock detection sensors, also may be incorporated in the computing device architecture 1100.

The magnetometer 1128 is configured to measure the strength and direction of a magnetic field. In some configurations the magnetometer 1128 provides measurements to a compass application program stored within one of the memory components 1104 in order to provide a user with accurate directions in a frame of reference including the cardinal directions, north, south, east, and west. Similar measurements may be provided to a navigation application program that includes a compass component. Other uses of measurements obtained by the magnetometer 1128 are contemplated.

The ambient light sensor 1130 is configured to measure ambient light. In some configurations, the ambient light sensor 1130 provides measurements to an application program stored within one of the memory components 1104 in order to automatically adjust the brightness of a display (described below) to compensate for low-light and high-light environments. Other uses of measurements obtained by the ambient light sensor 1130 are contemplated.

The proximity sensor 1132 is configured to detect the presence of an object in proximity to the computing device without direct contact. In some configurations, the proximity sensor 1132 detects the presence of a user's body (e.g., the user's face) and provides this information to an application program stored within one of the memory components 1104 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1132 are contemplated.

The accelerometer 1134 is configured to measure proper acceleration. In some configurations, output from the accelerometer 1134 is used by an application program as an input mechanism to control some functionality of the application program. For example, the application program may be a video game in which a character, a portion thereof, or an object is moved or otherwise manipulated in response to input received via the accelerometer 1134. In some configurations, output from the accelerometer 1134 is provided to an application program for use in switching between landscape and portrait modes, calculating coordinate acceleration, or detecting a fall. Other uses of the accelerometer 1134 are contemplated.

The gyroscope 1136 is configured to measure and maintain orientation. In some configurations, output from the gyroscope 1136 is used by an application program as an input mechanism to control some functionality of the application program. For example, the gyroscope 1136 can be used for accurate recognition of movement within a 3D environment of a video game application or some other application. In some configurations, an application program utilizes output from the gyroscope 1136 and the accelerometer 1134 to enhance control of some functionality of the application program. Other uses of the gyroscope 1136 are contemplated.

The GPS sensor 1138 is configured to receive signals from GPS satellites for use in calculating a location. The location calculated by the GPS sensor 1138 may be used by any application program that requires or benefits from location information. For example, the location calculated by the GPS sensor 1138 may be used with a navigation application program to provide directions from the location to a destination or directions from the destination to the location. Moreover, the GPS sensor 1138 may be used to provide location information to an external location-based service, such as E911 service. The GPS sensor 1138 may obtain location information generated via WI-FI, WIMAX, and/or cellular triangulation techniques utilizing one or more of the network connectivity components 1106 to aid the GPS sensor 1138 in obtaining a location fix. The GPS sensor 1138 may also be used in Assisted GPS ("A-GPS") systems.

The I/O components 1110 include a display 1140, a touchscreen 1142, a data I/O interface component ("data I/O") 1144, an audio I/O interface component ("audio I/O") 1146, a video I/O interface component ("video I/O") 1148, and a camera 1150. In some configurations, the display 1140 and the touchscreen 1142 are combined. In some configurations two or more of the data I/O component 1144, the audio I/O component 1146, and the video I/O component 1148 are combined. The I/O components 1110 may include discrete processors configured to support the various interface described below, or may include processing functionality built-in to the processor 1102.

The display 1140 is an output device configured to present information in a visual form. In particular, the display 1140 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1140 is a liquid crystal display ("LCD") utilizing any active or passive matrix technology and any backlighting technology (if used). In some configurations, the display 1140 is an organic light emitting diode ("OLED") display. Other display types are contemplated.

The touchscreen 1142, also referred to herein as a "touch-enabled screen," is an input device configured to detect the presence and location of a touch. The touchscreen 1142 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1142 is incorporated on top of the display 1140 as a transparent layer to enable a user to use one or more touches to interact with objects or other information presented on the display 1140. In other configurations, the touchscreen 1142 is a touch pad incorporated on a surface of the computing device that does not include the display 1140. For example, the computing device may have a touchscreen incorporated on top of the display 1140 and a touch pad on a surface opposite the display 1140.

In some configurations, the touchscreen 1142 is a single-touch touchscreen. In other configurations, the touchscreen 1142 is a multi-touch touchscreen. In some configurations, the touchscreen 1142 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1142. As such, a developer may create gestures that are specific to a particular application program.

In some configurations, the touchscreen 1142 supports a tap gesture in which a user taps the touchscreen 1142 once on an item presented on the display 1140. The tap gesture may be used for various reasons including, but not limited to, opening or launching whatever the user taps. In some configurations, the touchscreen 1142 supports a double tap gesture in which a user taps the touchscreen 1142 twice on an item presented on the display 1140. The double tap gesture may be used for various reasons including, but not limited to, zooming in or zooming out in stages. In some configurations, the touchscreen 1142 supports a tap and hold gesture in which a user taps the touchscreen 1142 and maintains contact for at least a pre-defined time. The tap and hold gesture may be used for various reasons including, but not limited to, opening a context-specific menu.

In some configurations, the touchscreen 1142 supports a pan gesture in which a user places a finger on the touchscreen 1142 and maintains contact with the touchscreen 1142 while moving the finger on the touchscreen 1142. The pan gesture may be used for various reasons including, but not limited to, moving through screens, images, or menus at a controlled rate. Multiple finger pan gestures are also contemplated. In some configurations, the touchscreen 1142 supports a flick gesture in which a user swipes a finger in the direction the user wants the screen to move. The flick gesture may be used for various reasons including, but not limited to, scrolling horizontally or vertically through menus or pages. In some configurations, the touchscreen 1142 supports a pinch and stretch gesture in which a user makes a pinching motion with two fingers (e.g., thumb and forefinger) on the touchscreen 1142 or moves the two fingers apart. The pinch and stretch gesture may be used for various reasons including, but not limited to, zooming gradually in or out of a web site, map, or picture.

Although the above gestures have been described with reference to the use one or more fingers for performing the gestures, other appendages such as toes or objects such as styluses may be used to interact with the touchscreen 1142. As such, the above gestures should be understood as being illustrative and should not be construed as being limiting in any way.

The data I/O interface component 1144 is configured to facilitate input of data to the computing device and output of data from the computing device. In some configurations, the data I/O interface component 1144 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1146 is configured to provide audio input and/or output capabilities to the computing device. In some configurations, the audio I/O interface component 1146 includes a microphone configured to collect audio signals. In some configurations, the audio I/O interface component 1146 includes a headphone jack configured to provide connectivity for headphones or other external speakers. In some configurations, the audio I/O interface component 1146 includes a speaker for the output of audio signals. In some configurations, the audio I/O interface component 1146 includes an optical audio cable out.

The video I/O interface component 1148 is configured to provide video input and/or output capabilities to the computing device. In some configurations, the video I/O interface component 1148 includes a video connector configured to receive video as input from another device (e.g., a video media player such as a DVD or BLURAY player) or send video as output to another device (e.g., a monitor, a television, or some other external display). In some configurations, the video I/O interface component 1148 includes a High-Definition Multimedia Interface ("HDMI"), mini-HDMI, micro-HDMI, DisplayPort, or proprietary connector to input/output video content. In some configurations, the video I/O interface component 1148 or portions thereof is combined with the audio I/O interface component 1146 or portions thereof.

The camera 1150 can be configured to capture still images and/or video. The camera 1150 may utilize a charge coupled device ("CCD") or a complementary metal oxide semiconductor ("CMOS") image sensor to capture images. In some configurations, the camera 1150 includes a flash to aid in taking pictures in low-light environments. Settings for the camera 1150 may be implemented as hardware or software buttons.

Although not illustrated, one or more hardware buttons may also be included in the computing device architecture 1100. The hardware buttons may be used for controlling some operational aspect of the computing device. The hardware buttons may be dedicated buttons or multi-use buttons. The hardware buttons may be mechanical or sensor-based.

The illustrated power components 1114 include one or more batteries 1152, which can be connected to a battery gauge 1154. The batteries 1152 may be rechargeable or disposable. Rechargeable battery types include, but are not limited to, lithium polymer, lithium ion, nickel cadmium, and nickel metal hydride. Each of the batteries 1152 may be made of one or more cells.

The battery gauge 1154 can be configured to measure battery parameters such as current, voltage, and temperature. In some configurations, the battery gauge 1154 is configured to measure the effect of a battery's discharge rate, temperature, age and other factors to predict remaining life within a certain percentage of error. In some configurations, the battery gauge 1154 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1112 may also include a power connector, which may be combined with one or more of the aforementioned I/O components 1110. The power components 1112 may interface with an external power system or charging equipment via an I/O component.

The disclosure presented herein may be considered in view of the following clauses.

Clause A: A computing device comprising: a processor; and a computer-readable storage medium having instructions stored thereupon which are executable by the processor and which, when executed, cause the computing device to, generate a primary data structure defining a centralized object, at least one attribute associated with the centralized object, and a primary identifier, generate a secondary data structure defining a dependent object, an attribute associated with the dependent object, and a secondary identifier, wherein the dependent data structure is configured to be dependent on the primary data structure, generate record data associating the primary identifier with an identity, wherein the record data also associates the identifier with the identity, causing a storage of the primary data structure and the secondary data structure in a storage device in communication with the computing device.

Clause B: The computing device of Clause A, wherein the secondary data structure is associated with a first identity, and wherein the instructions further cause the computing device to: generate a preview data structure defining a supplemental object and attributes associated with the supplemental object; communicate the preview data structure to a remote computing device; receive a command for a supplemental secondary data structure comprising the supplemental object and the attributes associated with the supplemental object, and in response to receiving the command, communicating the supplemental secondary data structure to the remote device.

Clause C: The computing device of Clause A through Clause B, wherein the instructions further cause the computing device to: generate data indicating an issue date of the primary data structure; and determine a status based, at least in part, on whether the issue date is within a predetermined time period of a predetermined status date, and wherein the one or more graphical elements are configured to provide an indication of the status if the issue date is within the predetermined time period of the predetermined status date.

Clause D: A computing device comprising: a processor; a hardware display interface; and a computer-readable storage medium having instructions stored thereupon which are executable by the processor and which, when executed, cause the computing device to receive a primary data structure defining a centralized object, at least one attribute associated with the centralized object, and a primary security key, receive a plurality of secondary data structures, wherein an individual secondary data structure of the plurality of secondary data structures defines a dependent object, an attribute associated with the dependent object, and a secondary security key that is dependent on the primary security key, generate data defining one or more graphical elements comprising a primary face and a plurality of sides, wherein the primary face is configured to display data associated with the centralized object and the at least one attribute associated with the centralized object, and wherein an individual side of the plurality of sides is configured to display data associated with the dependent object and the attribute associated with the dependent object, and cause a display of the one or more graphical elements on the hardware display interface.

Clause E: The computing device of Clause D, wherein the primary data structure defines a primary distribution parameter, and wherein the one or more graphical elements are configured to indicate the primary distribution parameter.

Clause F: The computing device of Clause D through Clause E, wherein the individual secondary data structure defines a secondary distribution parameter, and wherein the one or more graphical elements are configured to indicate the secondary distribution parameter.

Clause G: The computing device of Clause D through Clause F, wherein the least one attribute associated with the centralized object defines a status associated with the primary data structure, and wherein the one or more graphical elements are configured to provide an indication of the status.

Clause H: The computing device of Clause D through Clause G, wherein the attribute associated with the dependent object modifies the at least one attribute associated with the centralized object.

Clause I: The computing device of Clause D through Clause H, wherein the at least one attribute associated with the dependent object supplements the at least one attribute associated with the centralized object.

Clause J: The computing device of Clause D through Clause I, wherein the individual secondary data structure defines an inactive status and directions on how to obtain an update configured to modify the inactive status to an active status, and wherein the individual side is configured to display the directions.

Clause K: The computing device of Clause D through Clause J, the instructions further cause the computing device to: receive data indicating a completion of the directions; communicate a request to a remote computing device for authorization to modify the inactive status to the active status; receive data indicating the authorization to modify the inactive status to the active status; and modify the status of the secondary data structure to define the active status.

Clause L: The computing device of Clause D through Clause K, wherein the one or more graphical elements are configured to indicate that the individual side is dependent on the primary face.

Clause M: The computing device of Clause D through Clause L, wherein the one or more graphical elements comprises a single graphical element formed by the primary face and the plurality of sides.

Clause N: The computing device of Clause D through Clause M, wherein the instructions further cause the computing device to: communicate a request to verify an authenticity of a source of the primary data structure, wherein the request comprises at least a portion of the primary security key, and wherein the request is communicated to a remote computing device, and receive data indicating the authenticity of the source of the primary data structure.

Clause O: A method, comprising: receiving, at a computing device, a primary data structure defining a primary object and a primary attribute associated with the centralized object; receiving, at the computing device, a secondary data structure defines a secondary object, a secondary attribute associated with the secondary object, and a secondary identifier, wherein the secondary attribute or the secondary identifier define a dependency on the primary data structure; generating data defining one or more graphical elements comprising a first surface and a second surface, wherein the first surface is configured to display data associated with the primary object and the primary attribute, and wherein the second surface is configured to display data associated with the secondary object and the secondary attribute; and causing a display of the one or more graphical elements on a hardware display interface of the computing device.

Clause P: The method of Clause O, wherein the one or more graphical elements comprises a single graphical element formed by the first surface and the second surface.

Clause Q: The method of Clause O through Clause P, further comprising: receiving a supplemental data structure defining a supplemental object and a supplemental attribute; and modifying the single graphical element to include a third surface to display data associated with the supplemental object and the supplemental attribute.

Clause R: The method of Clause O through Clause Q, wherein the single graphical element is configured to provide a visual indication that the secondary data structure is dependent on the primary data structure.

Clause S: The method of Clause O through Clause R, wherein the secondary data structure is configured to restrict a utilization of the secondary object or the secondary attribute based, at least in part, on a status of the primary data structure.

Clause T: The method of Clause O through Clause S, further comprising: receiving contextual data defining user activity; modifying the display of the one or more graphical elements based, at least in part, on the contextual data.

Clause U: A method, comprising: receiving, at a computing device, a primary data structure defining a primary object, a primary attribute associated with the centralized object; receiving, at the computing device, a preview data structure comprising data including a description of a secondary object and data including a description of a secondary attribute associated with the secondary object; generating data defining one or more graphical elements comprising a first surface and a second surface, wherein the first surface is configured to display data associated with the primary object and the primary attribute, and wherein the second surface is configured to display the description of the secondary object and the description of the secondary attribute; and causing a display of the one or more graphical elements on a hardware display interface of the computing device.

Clause V: The method of Clause U, wherein the preview data structure includes directions on how to obtain a secondary data structure defining the secondary object and the secondary attribute associated with the secondary object, wherein the second surface is configured to display the directions, and wherein the method further comprises: receiving data indicating a completion of the directions; communicating a request to a remote computing device requesting the secondary data structure defining the secondary object and the secondary attribute; and receiving the secondary data structure from the remote computing device.

Clause W: The method of Clause U through Clause V: further comprising modifying the one or more graphical elements to cause a display of data associated with the secondary object and the secondary attribute.

Clause X: The method of Clause U through Clause W: wherein the preview data structure includes an interface command for obtaining obtain a secondary data structure defining the secondary object and the secondary attribute associated with the secondary object, wherein the second surface is configured to display the directions, and wherein the method further comprises: receiving a selection of the interface command; in response to the selection of the interface command, communicating a request to a remote computing device requesting the secondary data structure defining the secondary object and the secondary attribute; and receiving the secondary data structure from the remote computing device.

Clause Y: The method of Clause U through Clause X: further comprising modifying the one or more graphical elements to cause a display of data associated with the secondary object and the secondary attribute.

Based on the foregoing, it should be appreciated that concepts and technologies have been disclosed herein that provide, among other techniques, a mixed environment display of attached control elements. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A method, comprising:
   receiving, at a computing device, a primary data structure defining a primary object and a primary attribute associated with the primary object;
   receiving, at the computing device, a secondary data structure defining a secondary object, a secondary attribute associated with the secondary object, and a secondary identifier, wherein the secondary attribute or the secondary identifier define a dependency on the primary data structure;
   generating data defining one or more graphical elements comprising a first surface and a second surface, wherein the first surface is configured to display data associated with the primary object and the primary attribute, and wherein the second surface is configured to display data associated with the secondary object and the secondary attribute;
   receiving a supplemental data structure defining a supplemental object and a supplemental attribute;
   modifying the one or more graphical elements to include a third surface to display data associated with the supplemental object and the supplemental attribute; and
   causing a display of the one or more graphical elements on a hardware display interface of the computing device.

2. The method of claim 1, wherein the one or more graphical elements comprises a single graphical element formed by the first surface and the second surface.

3. The method of claim 2, wherein the single graphical element is configured to provide a visual indication that the secondary data structure is dependent on the primary data structure.

4. The method of claim 1, wherein the secondary data structure is configured to restrict a utilization of the secondary object or the secondary attribute based, at least in part, on a status of the primary data structure.

5. The method of claim 1, further comprising:
   receiving contextual data defining user activity; and
   modifying the display of the one or more graphical elements based, at least in part, on the contextual data.

6. A method, comprising:
   receiving, at a computing device, a primary data structure defining a primary object and a primary attribute associated with the primary object;
   receiving, at the computing device, a preview data structure comprising data including a description of a secondary object and data including a description of a secondary attribute associated with the secondary object;
   generating data defining one or more graphical elements comprising a first surface and a second surface, wherein the first surface is configured to display data associated with the primary object and the primary attribute, and wherein the second surface is configured to display the description of the secondary object and the description of the secondary attribute;
   receiving a supplemental data structure defining a supplemental object and a supplemental attribute;
   modifying the one or more graphical elements to include a third surface to display data associated with the supplemental object and the supplemental attribute; and
   causing a display of the one or more graphical elements on a hardware display interface of the computing device.

7. The method of claim 6, wherein the preview data structure includes directions on how to obtain a secondary data structure defining the secondary object and the secondary attribute associated with the secondary object, wherein the second surface is configured to display the directions, and wherein the method further comprises:
  receiving data indicating a completion of the directions;
  communicating a request to a remote computing device requesting the secondary data structure defining the secondary object and the secondary attribute; and
  receiving the secondary data structure from the remote computing device.

8. The method of claim 7, further comprising modifying the one or more graphical elements to cause a display of data associated with the secondary object and the secondary attribute.

9. The method of claim 6, wherein the preview data structure includes an interface command for obtaining obtain a secondary data structure defining the secondary object and the secondary attribute associated with the secondary object, wherein the second surface is configured to display the directions, and wherein the method further comprises:
  receiving a selection of the interface command;
  in response to the selection of the interface command, communicating a request to a remote computing device requesting the secondary data structure defining the secondary object and the secondary attribute; and
  receiving the secondary data structure from the remote computing device.

10. The method of claim 9, further comprising modifying the one or more graphical elements to cause a display of data associated with the secondary object and the secondary attribute.

11. A computing device comprising:
  a processor;
  a hardware display interface; and
  a computer-readable storage medium having instructions stored thereupon which are executable by the processor and which, when executed, cause the computing device to
    receive, at the computing device, a primary data structure defining a primary object and a primary attribute associated with the primary object;
    receive, at the computing device, a secondary data structure defining a secondary object, a secondary attribute associated with the secondary object, and a secondary identifier, wherein the secondary attribute or the secondary identifier define a dependency on the primary data structure;
    generate data defining one or more graphical elements comprising a first surface and a second surface, wherein the first surface is configured to display data associated with the primary object and the primary attribute, and wherein the second surface is configured to display data associated with the secondary object and the secondary attribute;
    receive a supplemental data structure defining a supplemental object and a supplemental attribute;
    modify the one or more graphical elements to include a third surface to display data associated with the supplemental object and the supplemental attribute; and
    cause a display of the one or more graphical elements on the hardware display interface of the computing device.

12. The computing device of claim 11, wherein the one or more graphical elements comprises a single graphical element formed by the first surface and the second surface.

13. The computing device of claim 12, wherein the single graphical element is configured to provide a visual indication that the secondary data structure is dependent on the primary data structure.

14. The computing device of claim 11, wherein the secondary data structure is configured to restrict a utilization of the secondary object or the secondary attribute based, at least in part, on a status of the primary data structure.

15. The computing device of claim 11, wherein the computer-readable storage medium has further instructions stored thereupon to:
  receive contextual data defining user activity; and
  modify the display of the one or more graphical elements based, at least in part, on the contextual data.

16. A computing device comprising:
  a processor;
  a hardware display interface; and
  a computer-readable storage medium having instructions stored thereupon which are executable by the processor and which, when executed, cause the computing device to
    receive, at a computing device, a primary data structure defining a primary object and a primary attribute associated with the primary object;
    receive, at the computing device, a preview data structure comprising data including a description of a secondary object and data including a description of a secondary attribute associated with the secondary object;
    generate data defining one or more graphical elements comprising a first surface and a second surface, wherein the first surface is configured to display data associated with the primary object and the primary attribute, and wherein the second surface is configured to display the description of the secondary object and the description of the secondary attribute;
    receive a supplemental data structure defining a supplemental object and a supplemental attribute;
    modify the one or more graphical elements to include a third surface to display data associated with the supplemental object and the supplemental attribute; and
    cause a display of the one or more graphical elements on a hardware display interface of the computing device.

17. The computing device of claim 16, wherein the one or more graphical elements comprises a single graphical element formed by the first surface and the second surface.

18. The computing device of claim 17, wherein the single graphical element is configured to provide a visual indication that the secondary data structure is dependent on the primary data structure.

19. The computing device of claim 16, wherein the secondary data structure is configured to restrict a utilization of the secondary object or the secondary attribute based, at least in part, on a status of the primary data structure.

20. The computing device of claim 16, wherein the computer-readable storage medium has further instructions stored thereupon to modify the one or more graphical elements to cause a display of data associated with the secondary object and the secondary attribute.

* * * * *